(12) United States Patent
Vandrovec

(10) Patent No.: US 8,665,266 B2
(45) Date of Patent: Mar. 4, 2014

(54) GLOBAL VISUALIZATION PROCESS TERRAIN DATABASE BUILDER

(75) Inventor: Bryan Vandrovec, Great Mills, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 716 days.

(21) Appl. No.: 12/821,812

(22) Filed: Jun. 23, 2010

(65) Prior Publication Data

US 2011/0316854 A1    Dec. 29, 2011

(51) Int. Cl.
*G06T 17/00*    (2006.01)
(52) U.S. Cl.
USPC .......................................................... 345/420
(58) Field of Classification Search
CPC ....... G06T 17/005; G06T 17/05; G06T 17/20; G06T 17/205; G06T 2210/36
USPC .......................................................... 345/420
See application file for complete search history.

(56) References Cited

U.S. PATENT DOCUMENTS

2002/0190982 A1* 12/2002 Kotcheff et al. .............. 345/420
2003/0107572 A1*  6/2003 Smith et al. ................... 345/428
2005/0264567 A1* 12/2005 Sommers ....................... 345/423

OTHER PUBLICATIONS

Renato Pajarola, Large Scale Terrain Visualization Using the Restricted Quadtree Triangulation, 1998 IEEE.*
Jian-Jun Bai et al., A Hierarchical Visualization Model of the Global Terrain Based on QTM, Geoinformatics 2008, Proc. of SPIE vol. 7143 714333-1.*
Stefan Rottger Real-Time Generation of Continuous Levels of Detail for Height Fields Abstract, 1998.
David Luebke Terrain level of Detail Abstract—Level of Detail for 3D Graphics 2003 pp. 185-228.
David Cline Terrain Decimation through Quadtree Morphing Abstract—Visualizations and Computer Graphics Jan.-Mar. 2001 (vol. 7 No. 1) pp. 62-69.
B. D. Larsen Real-time Terrain rendering using Smooth Hardware Optimized level of Detail Abstract—Journal of WSCG, vol. 11, No. 1, Feb. 3-7, 2003 Plzen, Czech Republic.
Kai Xu Database Support for Multiresolution Terrain Visualization Abstract, 2003.
Stefan Rottger Hardware Accelerated Terrain Rendering by Adaptive Slicing Abstract Stuttgart, Germany, Nov. 21-23, 2001.
Laurent Balmelli Software 1999.

* cited by examiner

*Primary Examiner* — Kee M Tung
*Assistant Examiner* — Frank Chen
(74) *Attorney, Agent, or Firm* — Mark D. Kelly; Charles Buskey; Mark O. Glut

(57) ABSTRACT

A process for optimizing a tile mesh for a surface in a level-of-detail hierarchy includes obtaining a plurality of elevation values for an elevation grid of the surface, downsampling the elevation grid to a resolution based on a minimum edge size for triangles of the tile mesh as determined by a level-of-detail parameter, encoding the elevation grid into a linearized quadtree of virtual nodes, iteratively optimizing the quadtree according to an adaptive sampling pattern based on one or more prioritized split tests; and converting the optimized linearized quadtree into a tile mesh.

15 Claims, 23 Drawing Sheets

Node Cell Pattern
(Numbers indicate node levels)

Node Cell

Node cell configuration from an arbitrary sample patter produced without the border split test ⇩ Conversion

Resulting Triangulation
(Binary triangle tree scheme)

Triangle Vertex

Triangle Face

US 8,665,266 B2

GLOBAL VISUALIZATION PROCESS TERRAIN DATABASE BUILDER

GOVERNMENT INTEREST

The invention described herein may be manufactured, licensed, and used by or for the U.S. Government.

BACKGROUND

The Global Visualization Process (GVP) constitutes a comprehensive software system for visualizing geospatial information. GVP may be used to display terrain, as well as cultural features, including buildings, landscaping, agriculture, events of tactical significance and virtually any other event, characteristic, attribute, or value that may be mapped into a two or three-dimensional geospatial domain. As a distributed, networked, and interactive display system for such data, GVP can be tailored to a number of applications in the general areas of training and simulation, command and control, intelligence, surveillance, and reconnaissance (ISR), and human factors research. U.S. Pat. No. 7,239,311, issued on Jul. 3, 2007 (the "'311 patent") and U.S. Pat. No. 7,564,455 issued on Jul. 21, 2009 (the "'455 patent"), are both concerned with GVP and are incorporated herein by reference for background purposes as if fully set forth.

The task of incorporating massive amounts of data into a geospatial visualization system, from diverse geo-referenced source datasets presents significant challenges. Previous versions of GVP, as described in the '311 patent and the '455 patent, relied upon pre-existing third-party software to process and transform source data, comprising mainly imagery and elevation grids, into a format supporting GVP's real-time, 3-D display capability. A number of technical and performance related shortcomings were discovered with that third-party software. In one example, restrictions on supported file-formats proved unacceptable. With respect to performance, the third-party software was unable to provide sufficient speed and scalability to efficiently handle the massive datasets required. In addition, run-time computational costs of prior art systems in loading and displaying terrain, particularly regarding CPU loading, were high. There were often reliability problems with the software, artifacts and other quality concerns with the output, and a limited set of attributes that could be configured. The software was also locked to a single operating system, and was not easily modified to incorporate new datasets and data structures. Moreover, most prior art terrain generation/display systems assume that execution will take place on a single machine residing entirely in memory, and thus, do not provide an architecture amenable to distributed processing and efficient on-demand distribution of terrain data over a network. A client-server based solution would allow for distributed computing resources over an arbitrarily large number of computing nodes. For at least the foregoing reasons a new solution was needed to process and transform terrain source data into a format supporting its real-time, 3-D display capability. Embodiments of a terrain database builder according to the present invention are directed to solving at least the foregoing problems.

SUMMARY

In general, in one aspect, a process for optimizing a tile mesh for a surface in a level of detail hierarchy that may exceed a client computer's memory includes obtaining a plurality of elevation values for an elevation grid of the surface, downsampling the elevation grid to a resolution based on a minimum edge size for triangles of the tile mesh as determined by a level-of-detail parameter, encoding the elevation grid into a linearized quadtree of virtual nodes, iteratively optimizing the quadtree according to an adaptive sampling pattern based on one or more prioritized split tests, and converting the optimized linearized quadtree into a tile mesh.

In general, in another aspect, a process for refinement of an adaptive sampling pattern for an elevation grid through selectively minimizing the amount of geometric detail given by the elevation grid includes applying a priority-based scheme of split tests to determine the refinement of the adaptive sampling pattern.

In general, in another aspect, a method of interpolating dataset samples for a raster-based dataset that may include no-data values includes selecting a group of neighboring data samples from the dataset, determining whether a data sample in the group of neighboring data samples has a no-data value, if a no-data value sample is found in the group of neighboring data samples, deriving a synthetic value for the no-data value sample from one or more data samples having data values in the group of neighboring data samples.

In general, in another aspect, a method to adaptively sample elevation data for a surface to create a tile mesh of triangles in a level of detail hierarchy includes downsampling the elevation data to produce an elevation grid with a resolution based upon a minimum edge size for the triangles such that a predetermined edge size is maintained, allocating a linear quadtree comprising nodes expanded to a depth according to the resolution of the elevation grid; and encoding the downsampled elevation data into nodes of the linear quadtree from the top down by employing an adaptive sampling pattern that uses one or more split tests for subdividing the nodes of the linear quadtree to increase a local vertex and triangle density.

Unless otherwise defined, all technical and scientific terms used herein have the same meaning as commonly understood by one of ordinary skill in the art to which this invention belongs. In case of conflict with any document incorporated by reference, the present disclosure controls. Other features and advantages will be apparent from the following detailed description.

BRIEF DESCRIPTION OF THE DRAWINGS

Embodiments according to the invention are illustrated in the accompanying drawings in which like reference numerals represent like parts throughout and in which.

DETAILED DESCRIPTION

Figure 1:
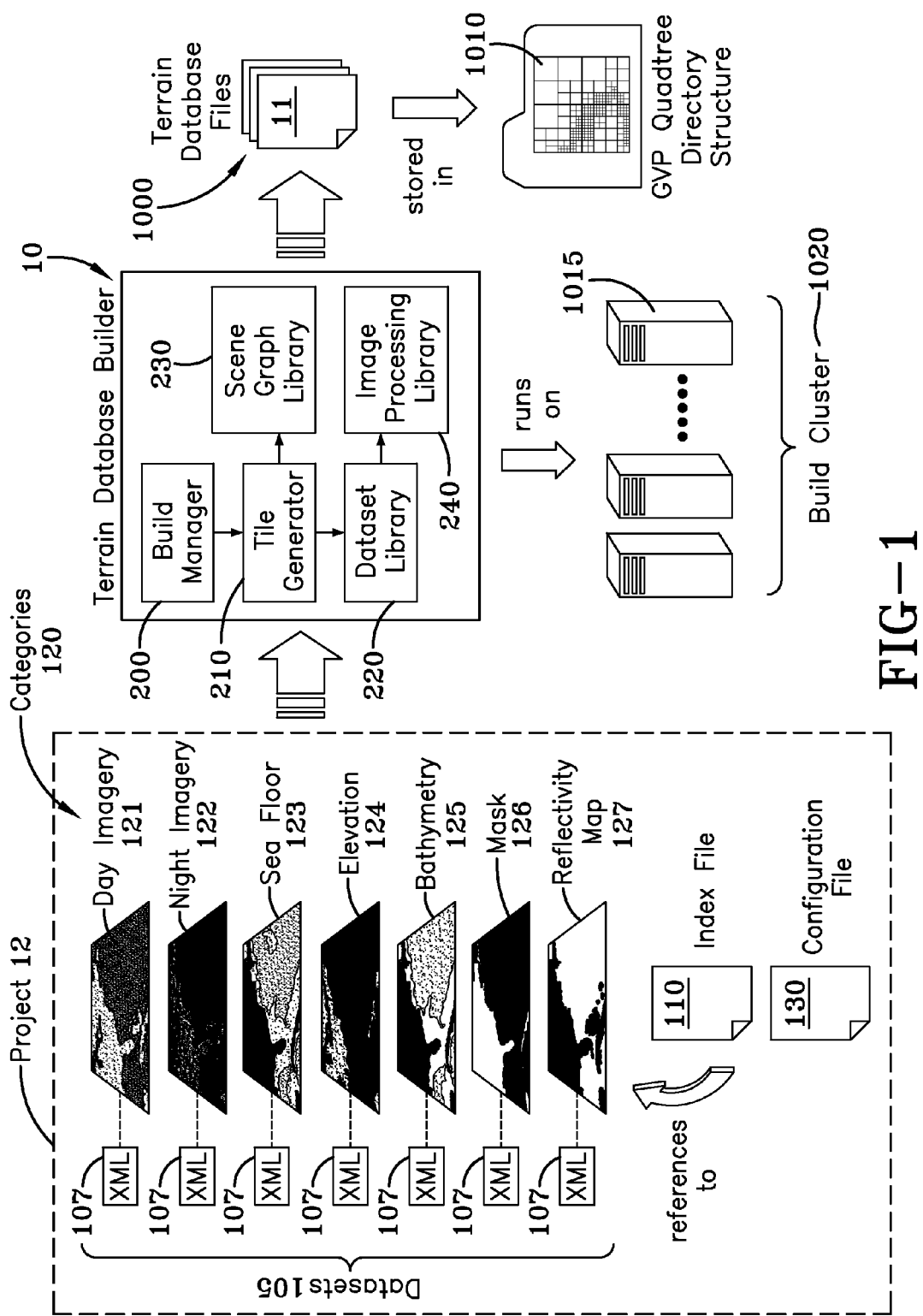
FIG. 1 shows a simplified structural block diagram of an embodiment of a terrain database builder in accordance with the disclosed subject matter.

In the following detailed description, reference is made to the accompanying drawings which are a part of this patent disclosure, and in which are shown by way of illustration specific embodiments in which the invention, as claimed, may be practiced. This invention may, however, be embodied in many different forms and should not be construed as limited to the embodiments set forth; rather, these embodiments are provided so that this disclosure will be thorough and complete, and will fully convey the scope of the invention to those skilled in the art.

An embodiment of a Terrain Database Builder according to the present invention may act as a standalone program or as a module to support a geospatial visualization system such as GVP, with the actual terrain visualization performed by core components of such systems. The Terrain Database Builder is primarily implemented using the C++ programming language and various standard libraries to provide common functions and data structures, complying with industry standards wherever possible. As would be apparent to one of ordinary skill in the art, other programming languages may be used, however, C++ is preferred because of its object-oriented features, compiled efficiency, tool availability, and widespread use. Likewise, while a number of industry-standard libraries have been used in the exemplary embodiment as a matter of convenience and to facilitate compatibility across a wide variety of platforms, the use of these libraries is not essential to the operation of embodiments according to the invention and alternative libraries may be used in alternative embodiments. For example, OpenGL 2.0 is currently a widely available and extremely popular library for hardware-accelerated graphics and thus has been used for advanced visual effects. Additionally, the Extensible Markup Language (XML) has been used for serialization of geospatial metadata. In all cases, the code underlying various embodiments according to the present invention has been written, and its dependencies chosen, so as to promote platform portability. Currently the target platforms are PC-based, running either Microsoft Windows, or various distributions of Linux. This integrated yet modular approach, combined with automatic code generation and other revisions within GVP, has enabled a number of performance and capability enhancements. The invention however is not limited to these specific embodiments.

Conceptually, in a terrain-synthesis process for a geospatial visualization system such as GVP, source datasets, which are primarily raster-based, geo-referenced imagery and elevation source datasets that are gathered from satellite or aerial sensors and encoded in a number of pervasive industry formats, are processed and composited by an embodiment of a Terrain Database Builder according to the present invention to produce databases of global extent, suitable for real-time display within the geospatial visualization system. These source datasets must be georeferenced and orthorectified before they are input to the Terrain Database Builder. Embodiments of a Terrain Database Builder according to the present invention support datasets defined with local datums and orthometric elevation values, as well as those defined using global datums and ellipsoidal heights expressed according to the geodetic convention. They are then categorized by type, for example, day imagery (diurnal), reflectance, elevation, and mask, and priority listed within an index file. Auxiliary metadata, i.e., data about the source datasets that is not intrinsic to the dataset file, are then optionally created by the process as hereinafter described. The Terrain Database Builder then accepts the index file and a project configuration file specifying the geographic area of interest (AOI), the desired level of detail, and the number of compute nodes (i.e., process threads) to use, among other parameters, and begins a build operation. As will be described in detail below, this operation has several major steps, including job creation for distributed processing, dataset culling via georegistration, on-demand file loading, data sampling, filtering and compositing, surface generation and warping in accordance with a geodetically prescribed geometry, and file output into a directory structure encoding spatial subdivision known as the GVP quadtree database directory structure.

The resulting terrain databases support both image and geometric level-of-detail (LOD) features, along with advanced reflectance models and material properties to produce exceptionally high realism in the rendered output. The database format is tile-based, and retains the quadtree structure for geographic indexing used in previous versions of GVP. A detailed log is also produced for status and diagnostic purposes. Embodiments of a Terrain Database Builder according to the present invention also support distributed processing across multiple machines over a network.

Figure 16:
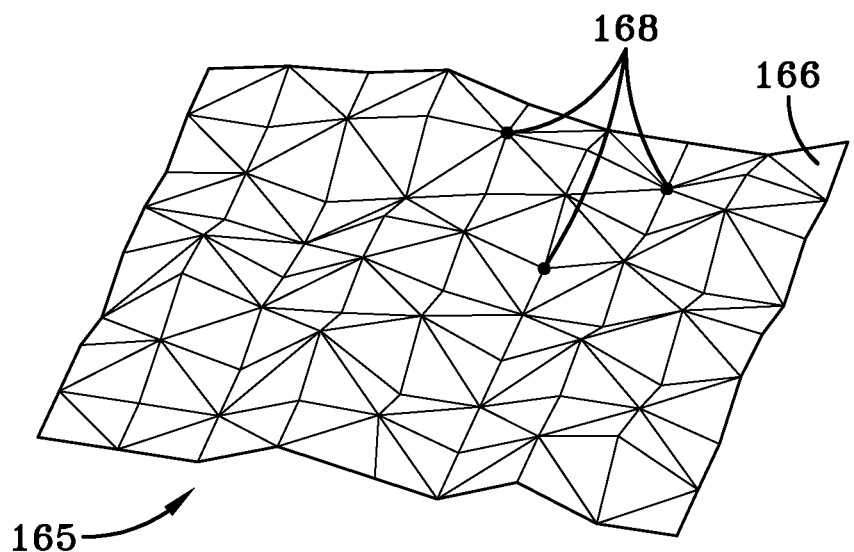
FIG. 16 illustrates a simplified and representative tile mesh, in accordance with the disclosed subject matter.

In general, each GVP tile comprises a tile mesh 165 (see FIG. 16) and one or more tile maps 160 (see FIG. 13) derived from georeferenced and orthorectified source datasets encoding mappable attributes. Such attributes may include, for example, color, surface normals, specular reflectivity, terrain type, and nocturnal lighting. Mesh geometry is expressed in an offset geocentric coordinate system, and by default assumes a WGS-84 reference ellipsoid for a figure of the Earth. Unlike terrain generators that employ triangular irregular networks (TINs) for surface tessellation, embodiments according to the present invention uniquely combine at least the following: prioritized refinement rules, linearized quadtrees, and hierarchical, semi-regular grids supporting vertex morphs. Systems embodying the present invention exhibit significantly increased processing speed, greater control in adaptive sampling of terrain features, independent and parallel tile processing for arbitrary scalability, and provide a natural extension to future support of smooth LOD transitions and runtime surface deformation. Moreover, a dynamic combination of vertex normals and normal maps is used to enhance and transition the appearance of surface topography throughout the LOD range. In addition to providing enhanced rendering features, embodiments according to the present invention are also backwards compatible with older graphics hardware lacking adequate support for programmable vertex and fragment processing under the OpenGL 2.0 standard. On such devices, terrain databases generated by an embodiment according to the present invention assume the same single-textured, Gouraud-shaded appearance as those provided by GVP systems described in the '311 patent and the '455 patent. Likewise they support the same access and display functions as those of previous implementations, including selection, retrieval, and optimization of terrain data with respect to the current viewpoint. In other words, the functions update the display on a continual basis to account for changes in the view position, which generally occur in response to user inputs. As the viewpoint descends to the surface, the visible region decreases and the spatial resolution increases, as would occur for an actual observer. The reverse happens with an increase in altitude. This operation relies on various error metrics, a paging scheme, and the traversal of a quadtree database directory structure as are described in the '311 patent and the '455 patent.

Embodiments of a Terrain Database Builder according to the present invention are able to support a wider range of source dataset formats, are able to use a variety of standard software modules across platforms, and are able to generate extended, auxiliary metadata, which significantly contributes to the flexibility and applicability of GVP and similar geospatial visualization systems. Additionally, a particular advantage of embodiments according to the present invention is the ability to simultaneously process source datasets in multiple parallel Terrain Database Builders. In the case of multiple parallel Terrain Database Builders, a build manager serves to coordinate the work performed. As such, it is responsible for creating jobs for processing by the individual Terrain Database Builders. These jobs specify blocks 17 of tiles to be built, and are distributed to the builders so as to optimize the load balancing of the system. The term "tile" as used in this patent document is an abstract term (and thus is not illustrated) that signifies a conceptual subdivision or unit of a terrain database or the work that generates it. It is distinct from a tile data structure or tile area of interest.

Dataset Collection for a Designated Project AOI

FIG. 1 shows a schematic block diagram of an embodiment of a Terrain Database Builder 10 according to the present invention. One or more source datasets 105 (only one per type is illustrated in FIG. 1), from diverse sources, for example, Shuttle Radar Topography Mission 1-arc-second data, the NASA-Goddard Blue Marble Image Mosaic, and others, in various formats, for example, Digital Terrain Elevation Data (DTED), Geographic Tagged Image File Format (GeoTIFF), and others, may be used as input to the Terrain Database Builder 10. Source datasets 105 are divided into categories 120 that describe different properties of a terrain. There may be arbitrarily many source datasets 105 in each category 120. Categories 120 may include day imagery (diurnal) 121, night imagery (nocturnal) 122, sea floor 123, elevation 124, bathymetry 125, mask 126 (e.g, land/sea, regions, political jurisdictions) and reflectivity 127. Additional categories 120 may include, for example, cloud, specular, and thematic. Another category 120 that may be included in alternative embodiments is known as "classification." Classification data generally maps the material composition of a terrain (for example, mineral deposits, type of vegetation, permafrost, steppe, and other geologic references) and is typically derived from spectrographic processing. Auxiliary metadata, i.e., data about the source dataset 105 that is not intrinsic to the source dataset 105, are then optionally created by the Terrain Database Builder 10. Each format for source datasets 105 potentially provides a different level of native support for metadata. In order to maintain a level of uniformity, embodiments according to the present invention optionally create supplementary extensible markup language (XML) metadata files 107 for some source datasets 105. For example, XML metadata files 107 may include no-data values and border-pixel values, reference datums, map projections, coordinate systems (for example, UTM), and other components that map this data to the geographical AOI. The metadata files 107 thus cover and extend the attributes natively supported by each format into a common superset. The use of such a schema represents a significant capability enhancement in terms of format flexibility, generalization, and translation without loss of information.

Figure 10:
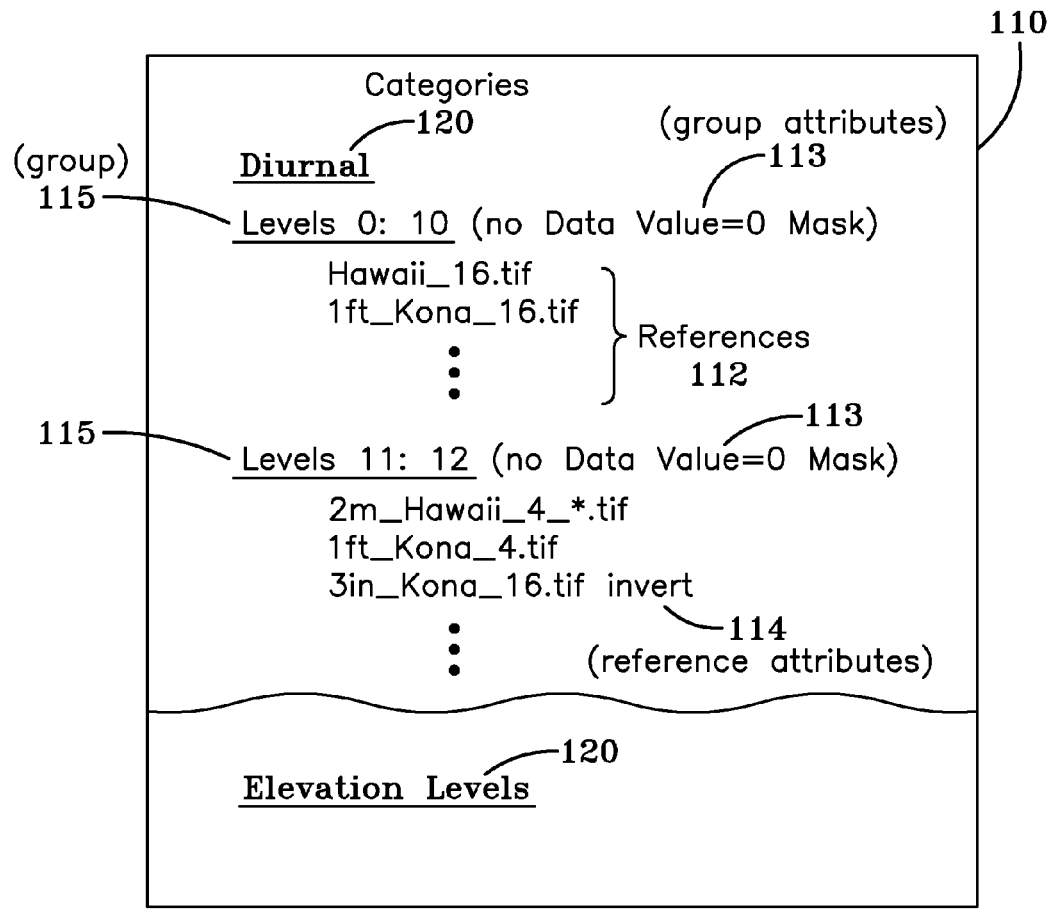
FIG. 10 illustrates a simplified and representative index file, in accordance with the disclosed subject matter.

A simplified example of an index file 110 is shown in FIG. 10. In addition to dividing source datasets 105 by categories 120, as discussed above, source datasets 105 are also divided into groups 115 according to levels of detail (LOD) in an index file 110. Within each group 115 in index file 110, references 112 to source datasets 105 are priority ordered in ascending fashion, such that source datasets 105 listed farther down will overwrite those preceding them during the compositing stage, should they overlap. Groups 115 also include group attributes 113 indicating no-data values or the application of a mask. References 112 may also have their own individual reference attributes 114. In the event of a conflict, individual reference attributes 114 override group attributes 113.

Figure 11:
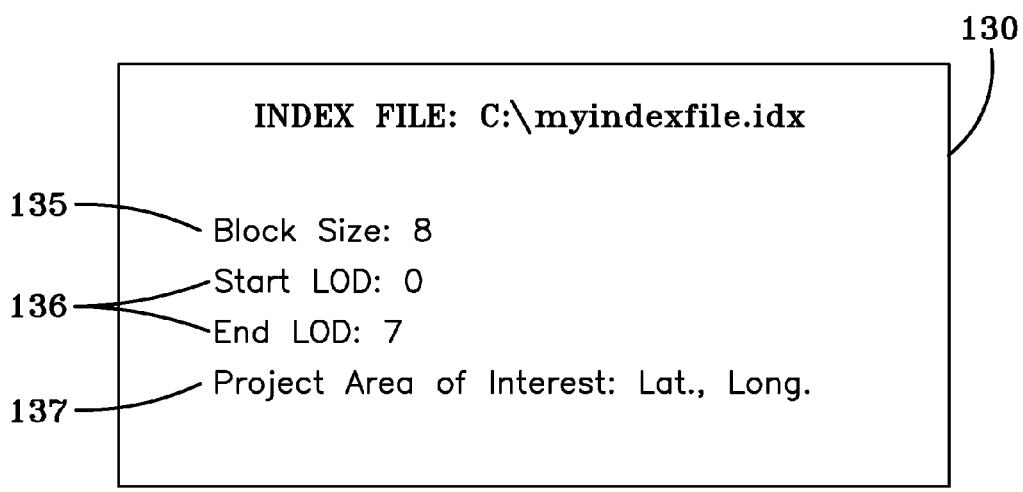
FIG. 11 illustrates a simplified and representative configuration file, in accordance with the disclosed subject matter.

The index file 110 is referenced by a build configuration file 130. A representative build configuration file 130 is shown in FIG. 11. In addition to referencing index file 110, build configuration file 130 stores a block size parameter 135 which is user specified and is generally empirically determined. The actual value for block size parameter 135 should be set to optimally leverage dataset caching within the Terrain Database Builder 10. Configuration file 130 also includes a designated geographical region 137 for project AOI 12 and a LOD range 136 for the resulting GVP terrain database 1000. In this implementation, project AOI 12 is given as an axis-aligned minimum bounding rectangle (MBR) in geographic coordinates (datum dependent, un-projected latitude and longitude). Configuration file 130 also contains a path to a GVP quadtree directory structure 1010.

Referring again to FIG. 1, Terrain Database Builder 10 creates terrain database files 11 that compose the GVP terrain database 1000 displayed by the GVP system. In other words, the GVP terrain database 1000 includes the set of all terrain database files 11. These terrain database files 11 are stored in the GVP quadtree directory structure 1010 described in the '311 patent and the '723 application. A project 14 is the set of all input data to Terrain Database Builder 10 and includes the source datasets 105, an index file 110, and a configuration file 130.

The Terrain Database Builder 10 includes several subsystems: a build manager 209, one or more tile generators 210, one or more instances of a dataset library 220, one or more instances of a scene graph library 230, and one or more instances of an image processing library 240. The build manager 209 is the top level executive control for the Terrain Database Builder 10. Its job is to parse the index file 110 and the configuration file 130 and to create and define jobs for the one or more tile generators 210. Tile generators 210 produce blocks 17 of tiles as illustrated in FIGS. 2-5. Tile generators 210 use the utility functions from the dataset library 220 for loading and processing source datasets 105. Tile generators 210 also call upon scene graph libraries 230 to encode tile data structures 140 in accordance with commonly used computer graphics conventions. Dataset libraries 220, in turn, use a set of utility functions from image processing library 240 to load and manipulate digital images in commonly used formats. Such commonly used formats include, but are not limited to, for example, Joint Photographic Experts Group 2000 (JPEG 2000), Tagged Image File Format (TIFF), Portable Network Graphics (PNG), Microsoft bitmap format (BMP), and Direct Draw Surface (DDS), and data structures used in memory, for example, RGB rasters, color indices and lookup tables.

While there is only one build manager 209, as mentioned above, there may be multiple tile generators 210, each with their own instance of a dataset library 220, a scene graph library 230 and an image processing library 240. Each tile generator 210 and attendant dataset library 220, scene graph library 230 and image processing library 240 may be executed on one or more processing nodes 1015 (i.e., CPU's, processors or cores) of a build cluster 1020. A terrain database file 11 is the persistence of a tile data structure 140 on a computer-readable medium (i.e., the file). In the exemplary embodiment, there is one tile data structure 140 in each terrain database file 11.

How Data is Organized and Added by the Terrain Database Builder

The GVP quadtree directory structure 1010 is made up of a number of levels of detail (LOD). The lowest LOD is level 0. There is no theoretical limit on the number of LODs; a typical bound for pragmatic reasons on the levels of detail is 24, which provides approximately centimeter accuracy. While the exemplary embodiment provides 24 levels, there may be more or fewer levels in alternative embodiments. The geographic area of Level 0 encompasses the entire Earth. At Level 0, each hemisphere of the Earth is represented by a single tile AOI 20. A tile AOI 20 refers to the geographic "footprint" covered by a tile data structure 140. At successively higher levels the number of tile AOIs 20 is increased by four times. Thus, if LOD 0 has 2 tile areas of interest 20, at LOD 1 there will be 8 tiles 19, at LOD 2 there will be 32 tiles 19, at LOD 3 there will be 128 tiles 19, and so on. As the number of tiles is increased the capability for increased level of detail is increased proportionally.

While the surface of the Earth is the area mapped in this embodiment, alternative embodiments of GVP may be employed to map other ellipsoidal physical entities, objects or structures, including, for example, celestial bodies (e.g., the Moon, Mars, Venus, an asteroid, etc.) as well the ellipsoidal surfaces of other objects, large or small.

Figure 2:
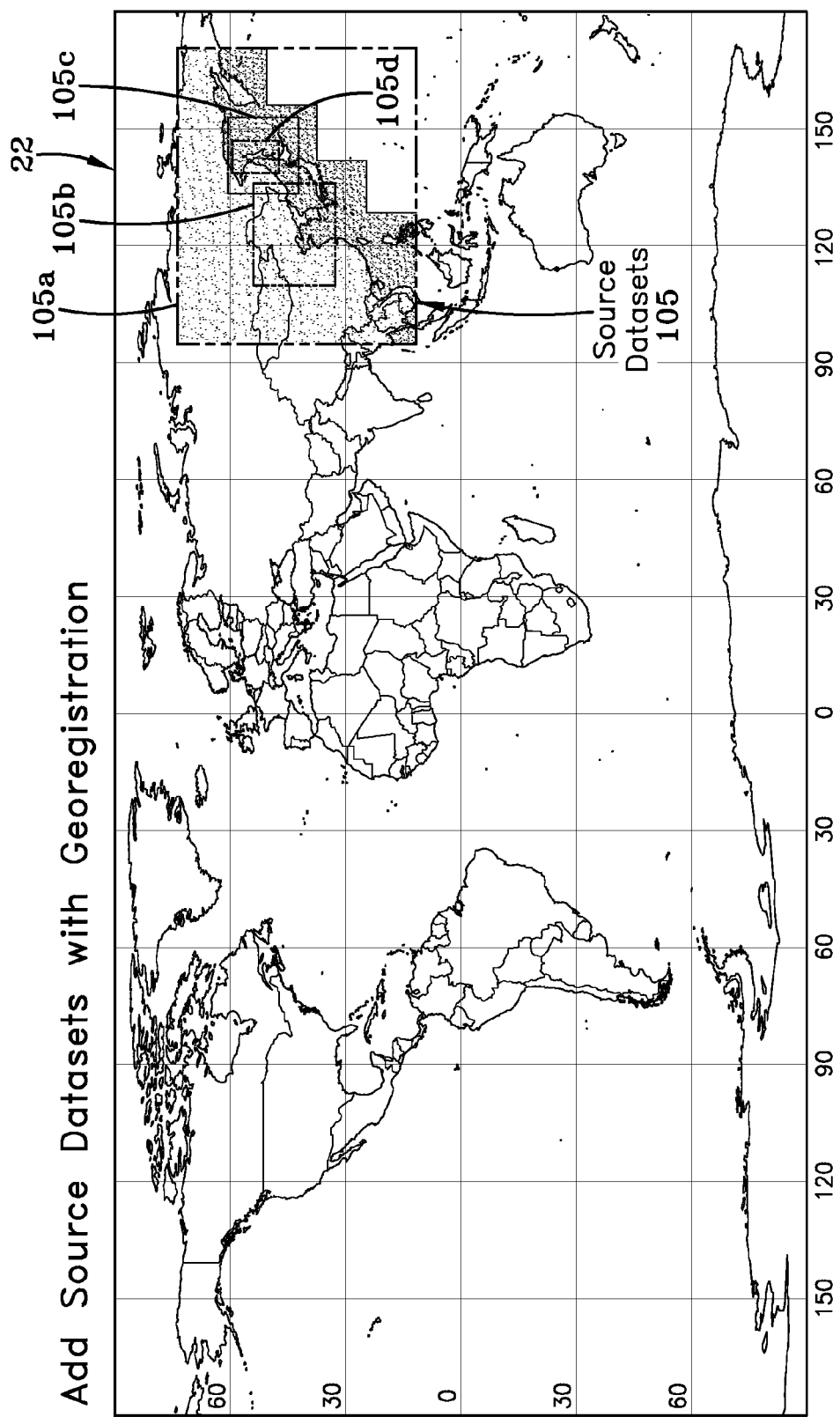
FIG. 2 shows a representative flattened projection of a map of the Earth depicting areas in which a number of source datasets are located in accordance with the disclosed subject matter.

FIG. 2 shows a flattened projection of a map of the Earth 22 with a number of source datasets 105*a-d* grouped in and around the same geographical area. In general, each source dataset 105 is comprised of a number of dataset samples 106 (see FIG. 15) and has its own geographical extent and horizontal resolution. Source datasets 105 may be geometric (encoding height values) or non-geometric (encoding imagery or other data). Source datasets 105 used for defining terrain geometry contain data samples 106 representing elevation or bathymetry values measured relative to a geoid or reference ellipsoid model of the Earth (or other planetary body). Data samples 106 of each source dataset 105 must be orthorectified and geo-registered, such that they are precisely mapped to a specific region on the surface. While source datasets 105 are generally rasterized, i.e., arranged in a rectangular array or raster pattern, this need not always be the case. For example, data in other formats, which may be topographic, or presented in another vector format, may be converted into raster formats and then imported. The "post spacing" or real-world distance between data samples 106 determines the horizontal resolution of the source dataset 105 and typically varies from centimeters to kilometers from one source dataset 105 to another, depending on altitude, sensor capabilities, and other factors present during data acquisition. Source datasets 105 used for input to a terrain-synthesis process according to the present invention may also have different post spacings. Data samples 106 in elevation 124/bathymetry 125 source datasets 105 are preferably encoded using a 16 or 32-bit signed data type for enhanced range and resolution along the local vertical (normal). Additionally, data samples 106 may also be floating point values, signed or unsigned values.

Figure 15:
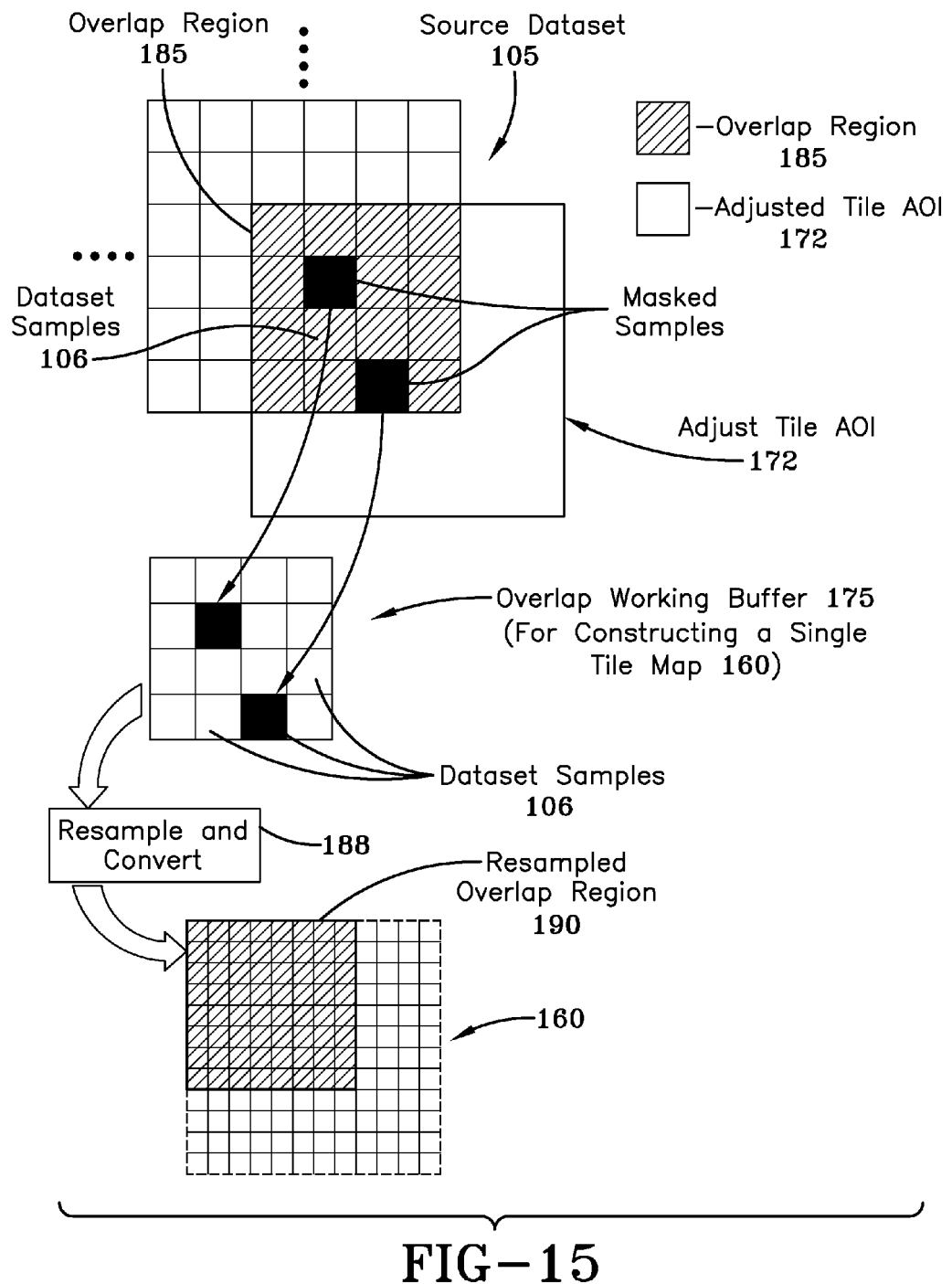
FIG. 15 is a simplified and generalized illustration of the operations of determining an overlap region between a source dataset and adjusted tile area of interest, copying data samples from the overlap region to an overlap working buffer, resampling, converting the source data, if necessary, and copying the resampled data to a resampled overlap region in the tile map, in accordance with the disclosed subject matter.

Source datasets 105 may contain data samples 106 that overlap, in whole or in part, the geographic area covered by one or more other source datasets 105. For example, in FIG. 2, source dataset 105*a* completely encloses the geographic area covered by source datasets 105*b-d*. Source datasets 105*b* and 105*d* are partially overlapping and 105*c* encloses the area covered by 105*d*. The process of resampling with precedence, filtering, and conversion to account for areas of overlap, and data samples of different types and resolutions, is illustrated in FIG. 15 and is discussed in detail below.

Figure 3:
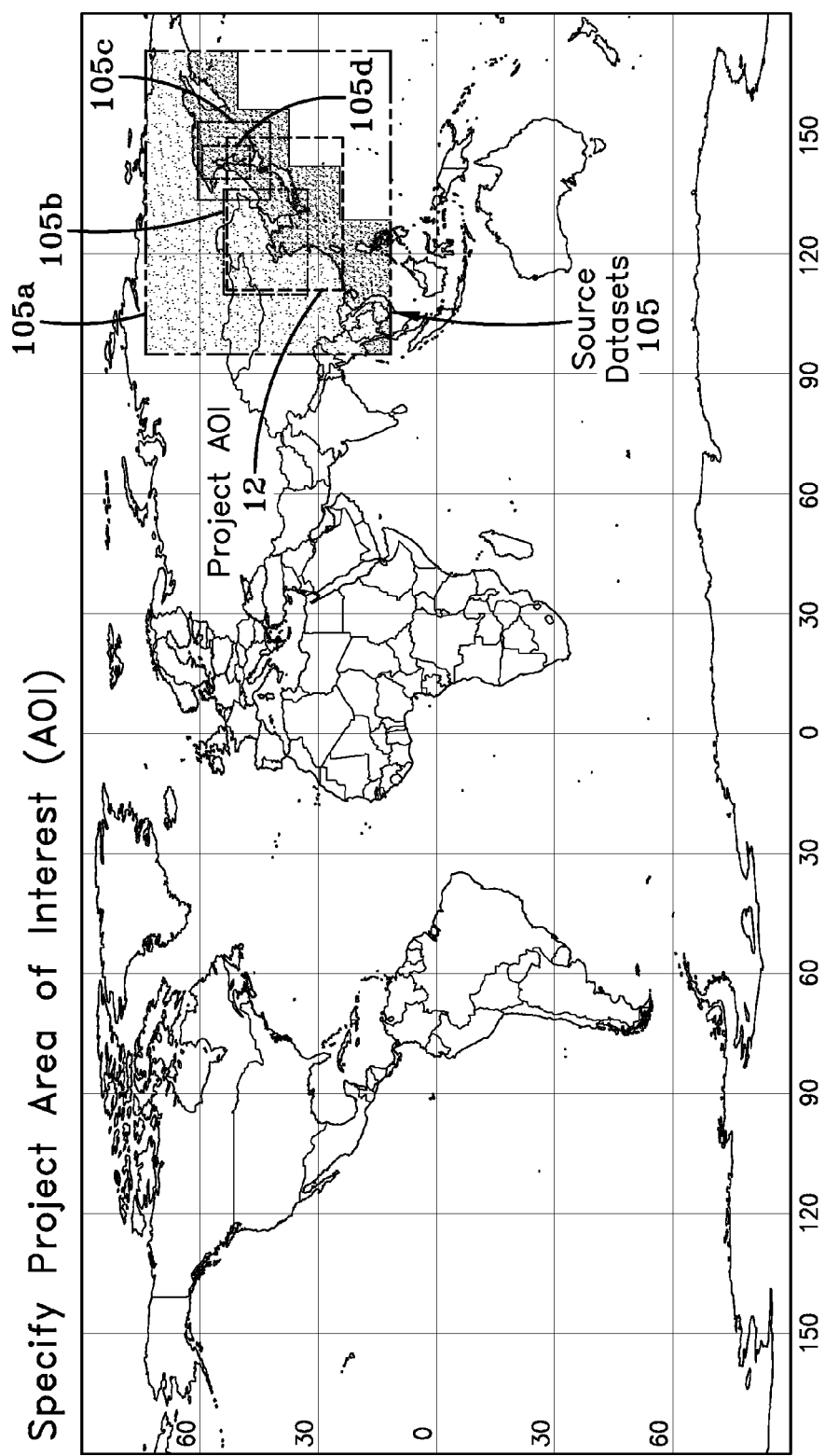
FIG. 3 shows the subject matter illustrated in FIG. 2 and further depicts a project area of interest, in accordance with the disclosed subject matter.

FIG. 3 shows the map of the Earth 22 with source datasets 105 as in FIG. 2. Additionally, as noted above, project AOI 12 is delineated within the geographic extent covered by source datasets 105. Note, however, that in one corner of project AOI 12, no source dataset 105 coverage is available. During the build process this region will be filled with default values.

Figure 4:
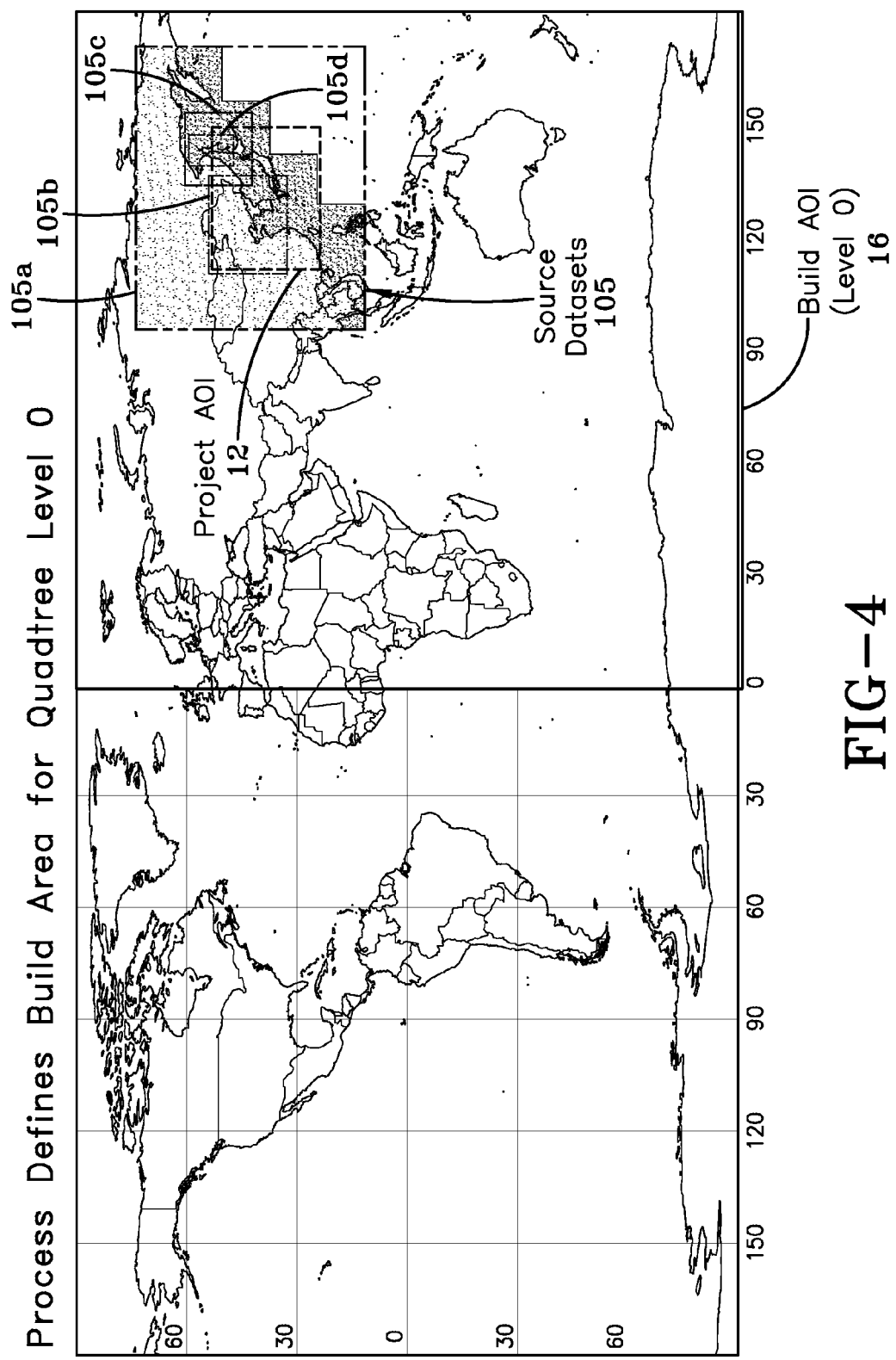
FIG. 4 shows the subject matter illustrated in FIG. 3 and further depicts a build area of interest which, at a quadtree level of detail 0, covers a hemisphere of the Earth, in accordance with the disclosed subject matter.

FIG. 4 shows the addition of a build AOI 16, which at LOD 0, covers an entire hemisphere of the Earth. If the project AOI 12 spans both hemispheres of the Earth, then both hemispheres must be processed at LOD 0. At any given level, the build AOI 16 is the smallest region allowable by the LOD which contains the project AOI 12. This constraint is imposed by the GVP visualization system and is not intrinsic to the Terrain Database Builder 10. The Terrain Database Builder 10 is arbitrary and, in general, embodiments according to the present invention can be used to build a single tile or multiple tiles for any region at any spatial resolution.

Figure 5:
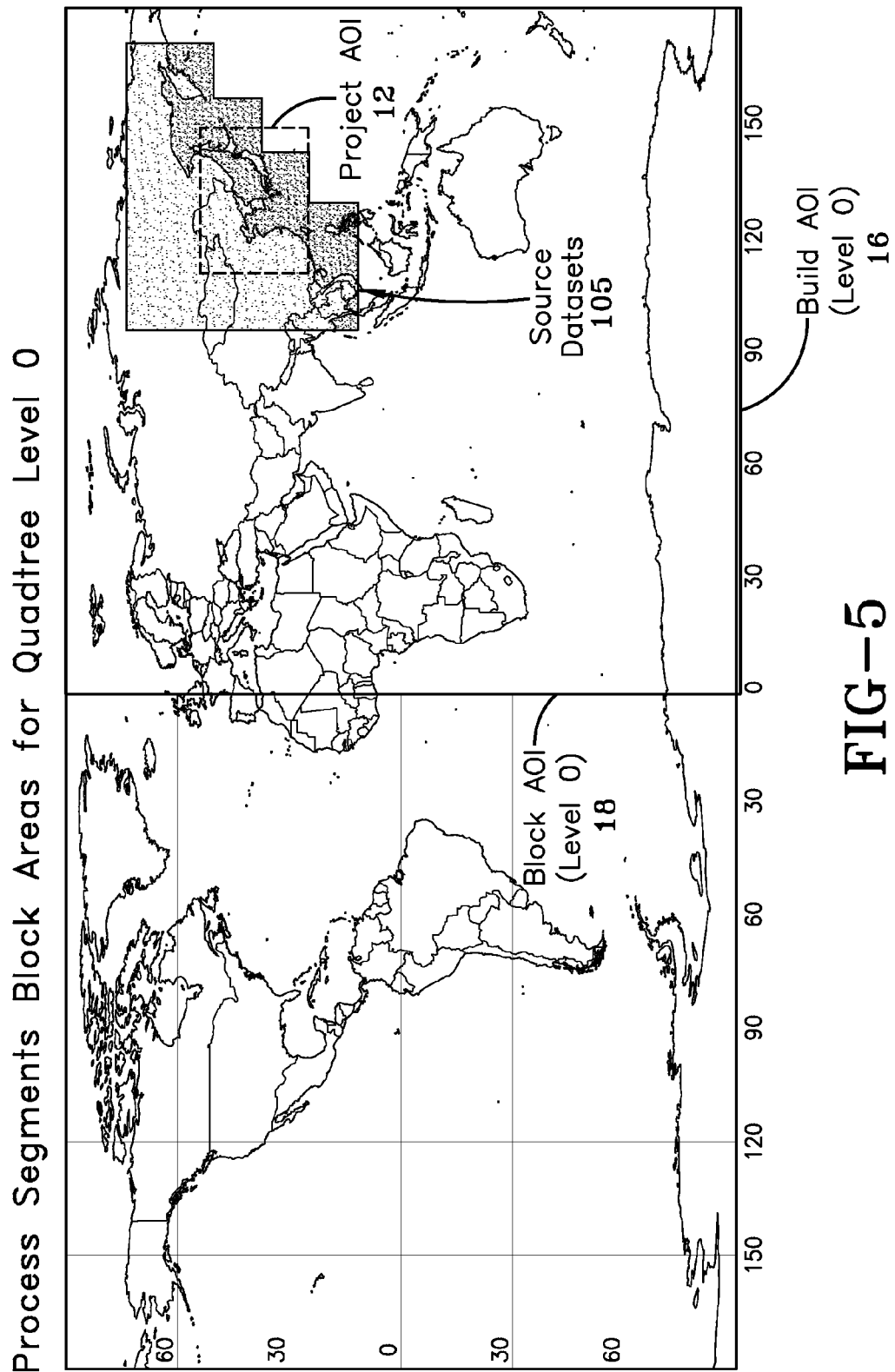
FIG. 5 shows the subject matter illustrated in FIG. 4 and further depicts a block area of interest for quadtree level of detail 0, in accordance with the disclosed subject matter.
Figure 6:
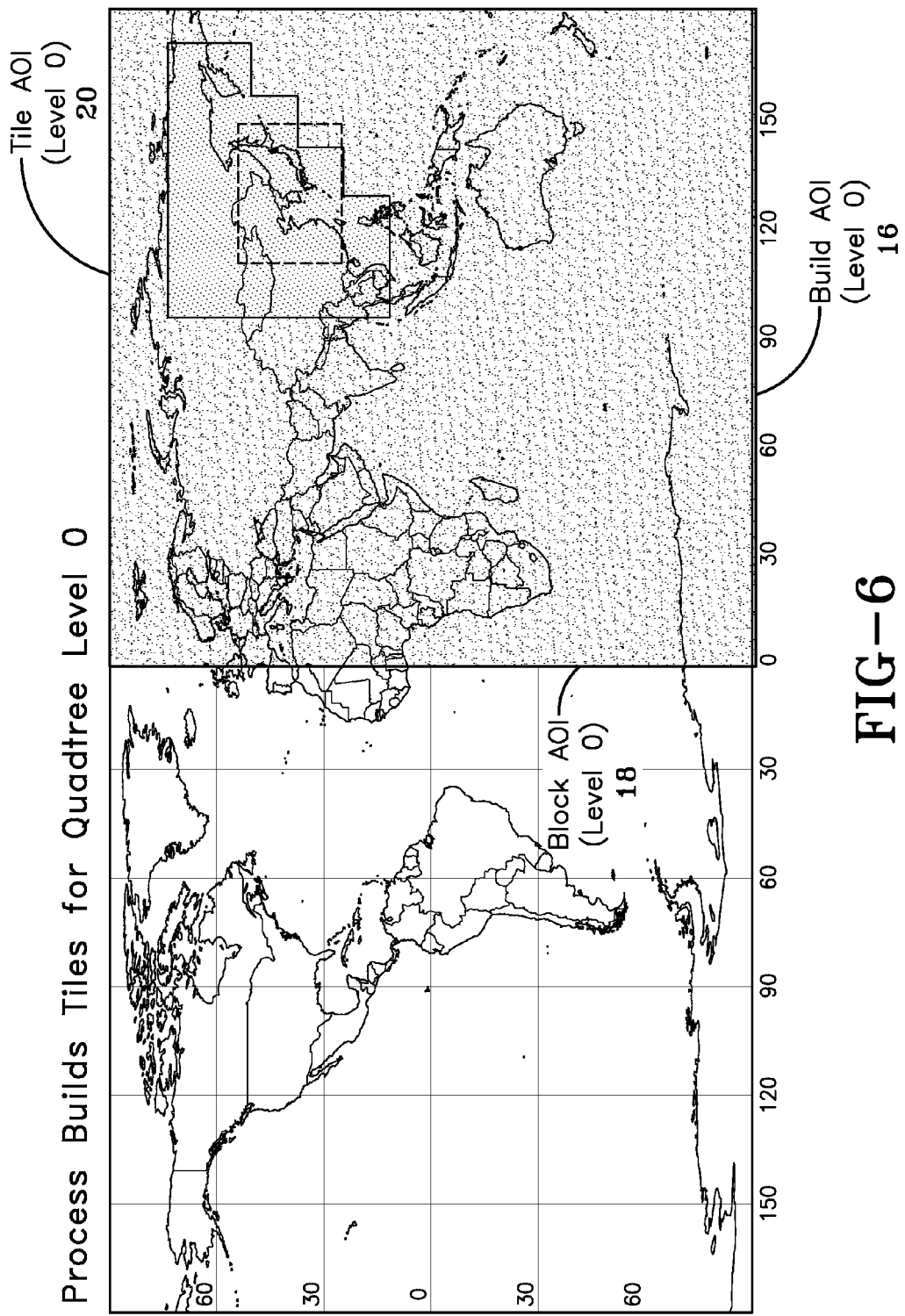
FIG. 6 shows the subject matter illustrated in FIG. 5 but with the project area of interest and source datasets deemphasized, and further depicts a tile area of interest for quadtree level of detail 0, in accordance with the disclosed subject matter.

FIG. 5 shows the overlay of a block AOI 18 which, at this level, is coextensive with the build AOI 16. A block AOI 18 represents an efficiently sized subset of the build AOI 16. A "block" (not illustrated in the drawings) refers to a batch of tile data structures 140. The use of a block allows for certain overhead amortization among tiles in the block 17. As shown in FIG. 6, block AOI 18 may be subdivided into a number of tile areas of interest 20 for which a matrix of tile data structures 140 will be built. Each block 17 can be built independently and on different processing nodes, if desired. A tile data structure 140 refers to an in-memory encoding of data describing a discrete segment of the GVP terrain database 1000. The process for building a tile data structure 140 is illustrated in FIGS. 12A-12D. In the exemplary embodiment, there is one tile data structure 140 contained in each terrain database file 11, but this correspondence is not a fixed feature of the invention.

As in FIGS. 5 and 6, block AOI 18 is coextensive with build AOI 16. In the general case, as noted above, the block AOI 18 may be subdivided into a number of tile AOIs 20. In this example, only one subdivision is needed because of a constraint imposed at LOD 0 by the GVP quadtree database structure 1010. Thus, this figure illustrates the process step of building a single tile data structure 140 for LOD 0. Tile data structures 140 are built in memory and then stored to a terrain database file 11.

Figure 7:
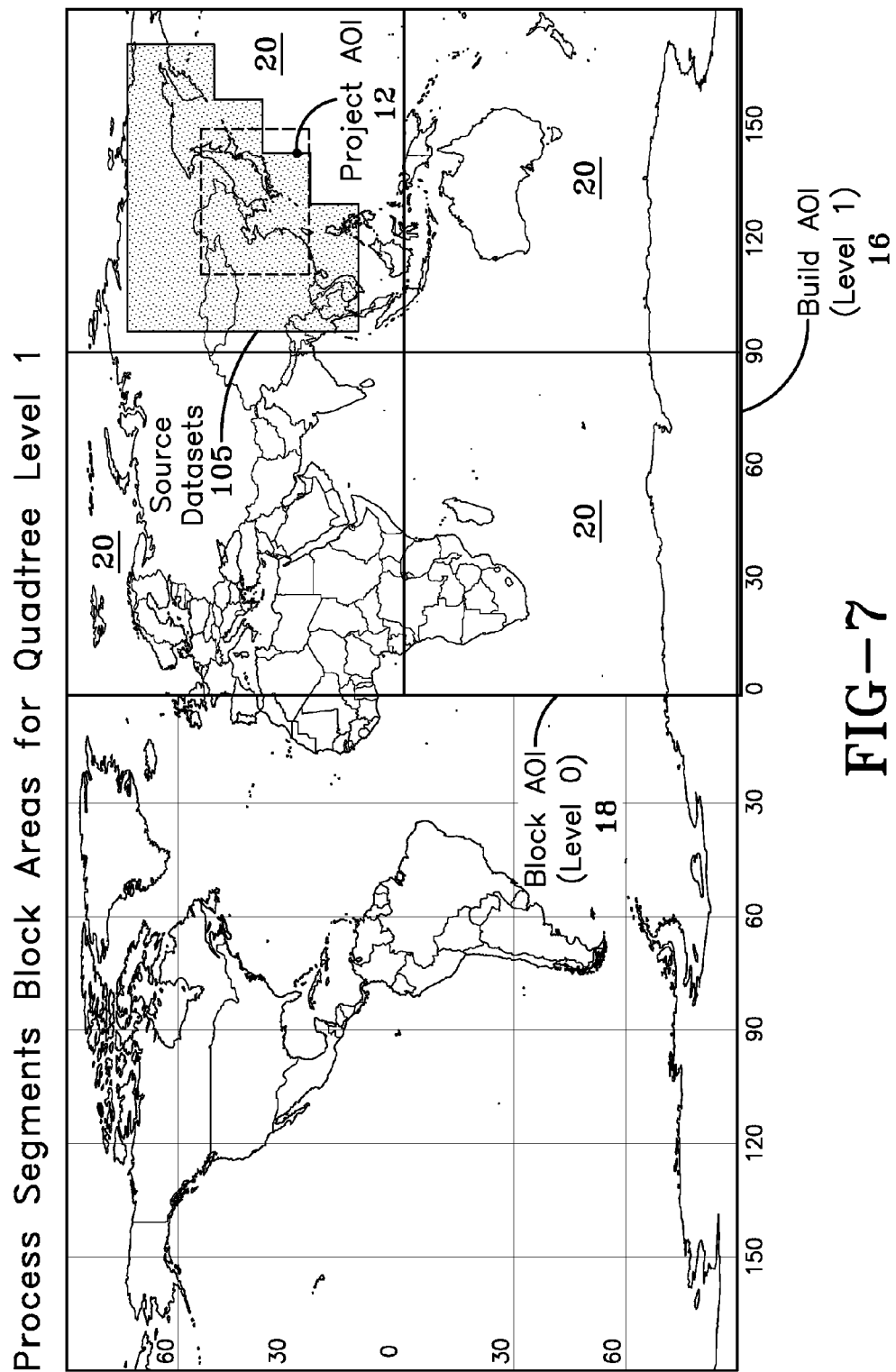
FIG. 7 shows the subject matter illustrated in FIG. 6 and further depicts the project area of interest, the source datasets, and four tile areas of interest for a quadtree level of detail 1, in accordance with the disclosed subject matter.

FIG. 7 illustrates the progression of the build process to LOD 1. At LOD 1 the build AOI 16 is spanned by four tile AOIs 20. Note that the four tile AOIs 20 at LOD 1 cover the same geographic area as the single tile AOI 20 at Level 0.

Figure 8:
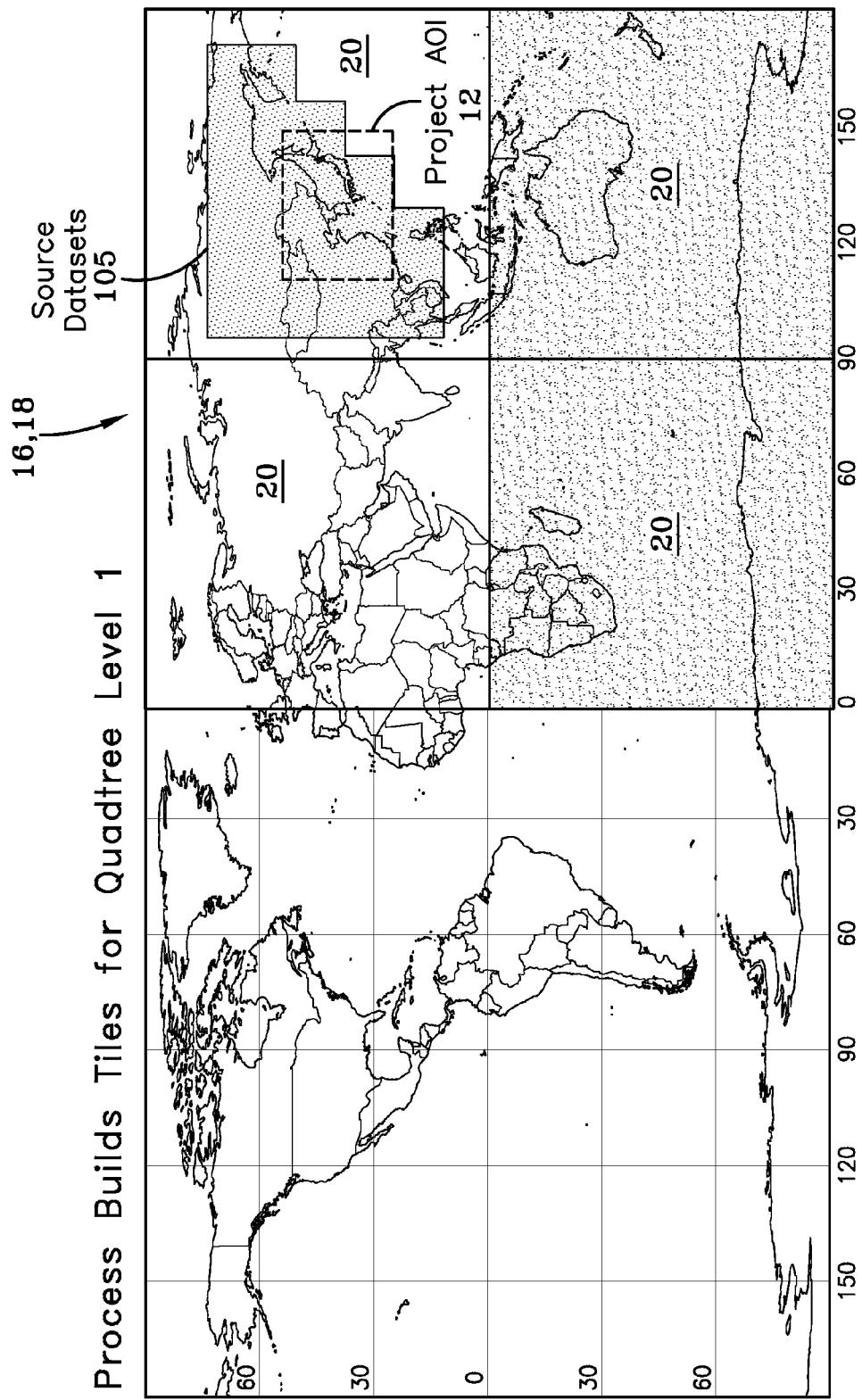
FIG. 8 shows the subject matter illustrated in FIG. 7 and indicates the progressive processing of the four tile areas of interest into four tile data structures, in accordance with the disclosed subject matter.

FIG. 8 indicates the processing of tiles for LOD 1, for which tile AOIs 20 are illustrated. At LOD 1, four tile data structures 140 in block 17 will be built in memory and written to terrain database files 11. As in the example illustrated in FIG. 5, in this example, build AOI 16 is coextensive with block AOI 18.

Figure 9:
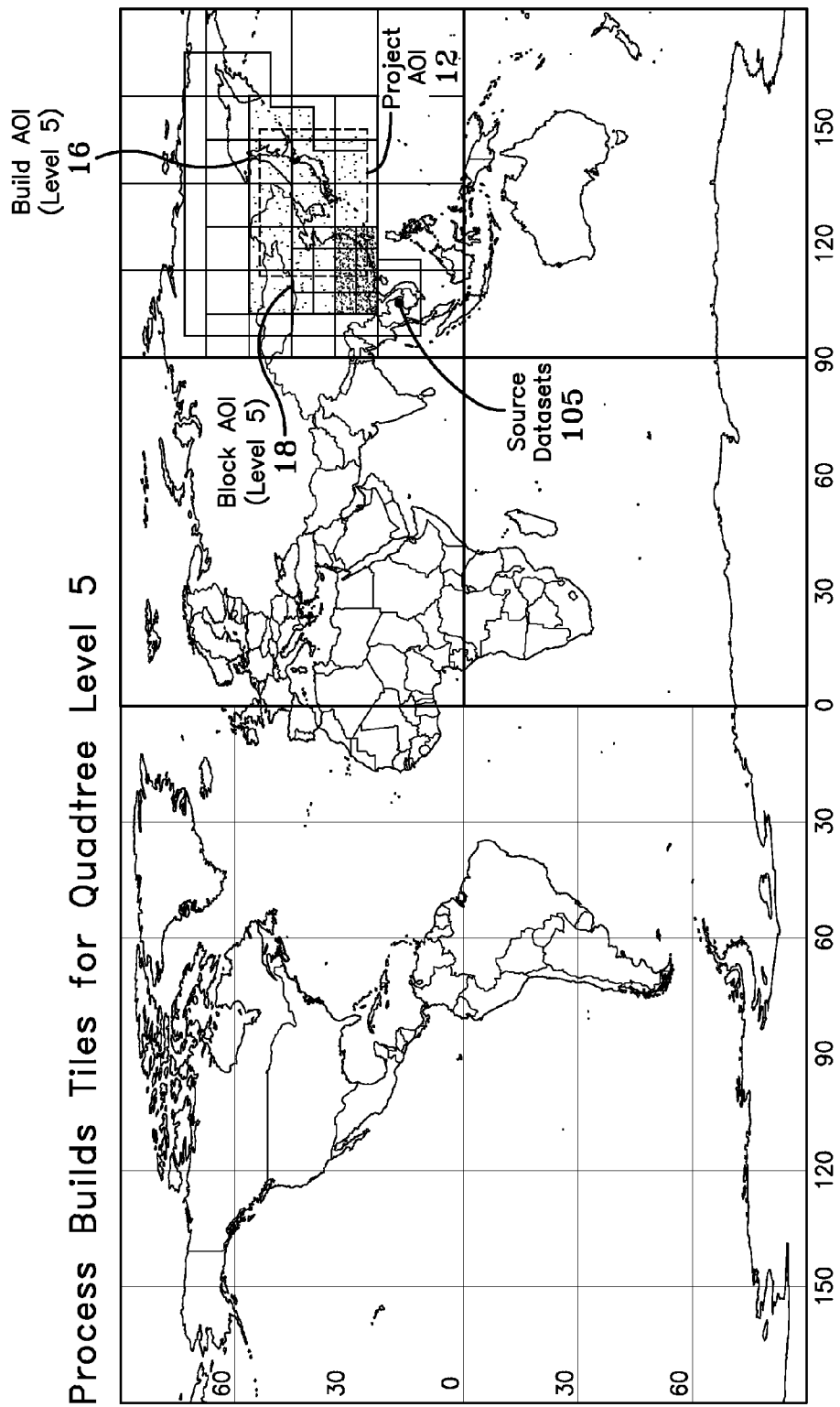
FIG. 9 shows the subject matter illustrated in FIG. 8, and further shows how the recursion of the tile build process resolves finer and finer levels of detail and closes in on the project area of interest.

FIG. 9 shows a spatial configuration typical of most of the build process execution. In contrast to FIG. 8, the block AOI 18 of FIG. 9 is not coextensive with the build AOI 16, but rather covers a subregion contained within it. Successive blocks are processed to complete coverage of the build AOI 16. In this example at LOD 5, the recursion continues its progression to finer levels of detail, and the build AOI 16 monotonically contracts with each successively higher LOD to converge on the project AOI 12. Note that the block size is limited to a maximum number of tiles in each dimension, empirically determined for efficient processing, which in this case yields a 4×4 block 17 of tiles 19. The build process proceeds in a similar fashion to successively higher LODs until the maximum level of detail is reached as specified in the configuration file 130.

Raster Sampling and Compositing

Figure 12A:
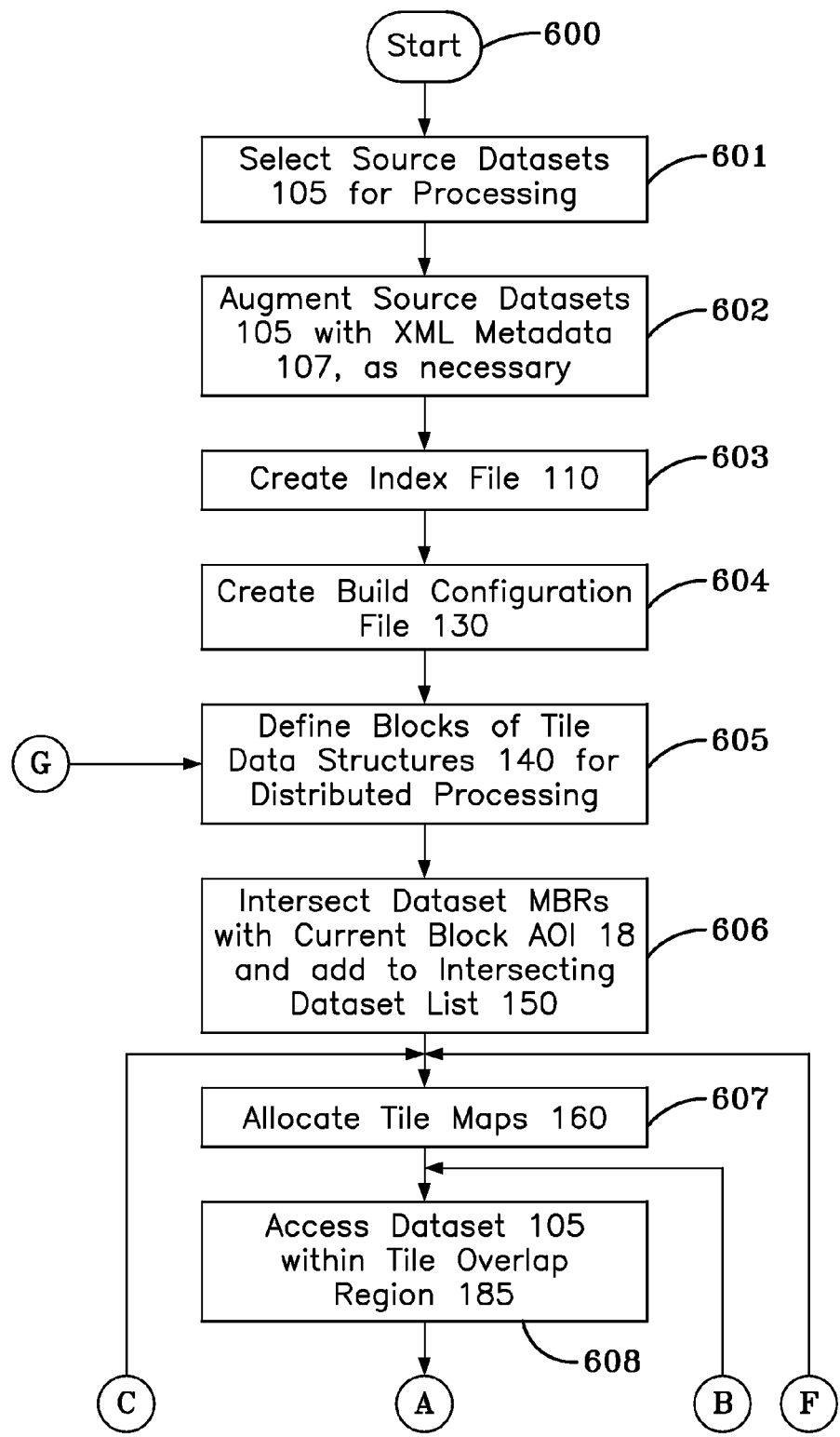
FIGS. 12A to 12D show a simplified functional block diagram of the overall operation of a system in an embodiment according to the present invention.

After the source datasets 105 have been collected, categorized and referenced in the index file 110, appropriate metadata files 107 have been generated, and a configuration file 130 has been created, the Terrain Database Builder 10 parses index file 110 and tests for intersections between the source datasets specified in references 112 and the project AOI 12 (process steps 601-606, FIG. 12A). Source datasets 105 that are checked for intersection with the project AOI 12 are recorded in an intersection dataset list 150 (step 606, FIG. 12A), which is an instance of a container abstract data type, for example, a linked list or a dynamic array. Not all source datasets 105 will overlap the project AOI 12 (or, more precisely, the block AOI 18 in the current implementation). In the interests of efficiency, only the header section, which contains geo-registration information, of each source dataset 105 and/or associated metadata files 107, if they exist, are loaded during the operation to determine an overlapping dataset list (not illustrated).

Figure 13:
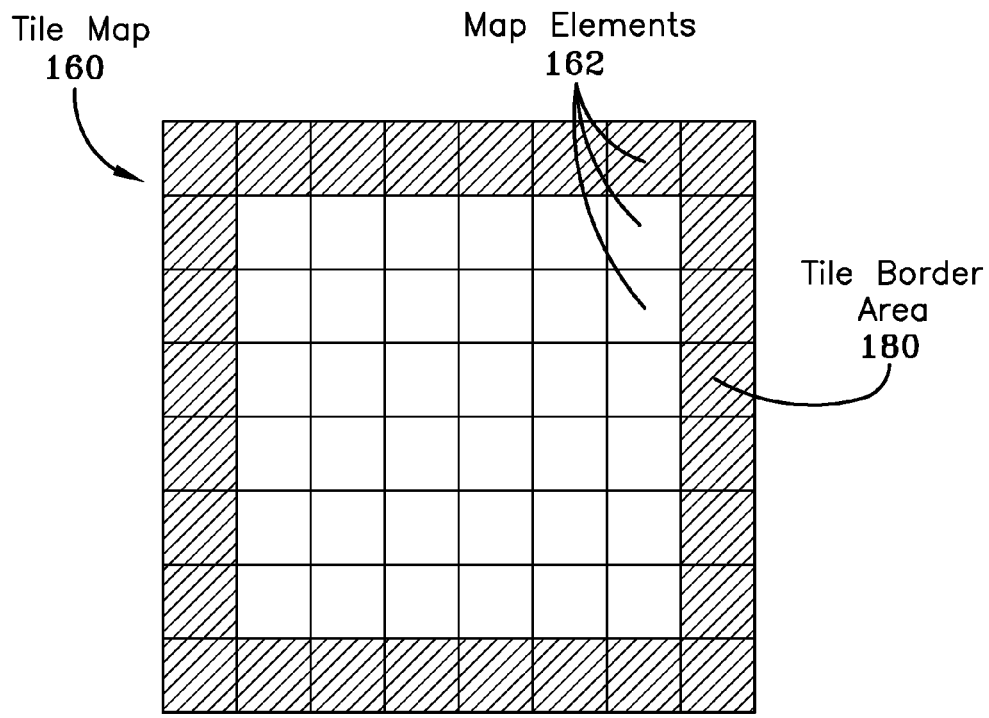
FIG. 13 illustrates a simplified and representative tile map, in accordance with the disclosed subject matter.

Conceptually, intersecting datasets 105 are then cropped to the tile areas of interest 20, and resized and resampled to match the spatial resolution of the tile data structures 140 with appropriate magnification/minification filtering. The filter types include nearest neighbor, bilinear and bicubic. The cropped source datasets 105 are then composited into a hierarchical mosaic of tile maps 160 (steps 608-610, FIGS. 12A/B) from which the GVP terrain database 1000 is built. A tile map 160, as used herein, is a generalization of a texture map composed of map elements 162 arranged in a matrix, each of which contains one or more values. A simplified representation is shown in FIG. 13. In general, tile maps 160 are mapped onto a tile mesh 165 (described below) during rendering, i.e., the process of graphically depicting tile data structures 140 in a synthesized view of the terrain. The values contained in map elements 162 of tile map 160 are typically used to encode coloration, surface normals, surface masking and specular reflectance. Tile maps 160 containing elevation data, however, are not mapped onto the tile mesh 165 but rather are used to derive it, as will be explained below. In general, the tile data structure 140 will include one or more tile maps 160 and a tile mesh 165.

Figure 14:
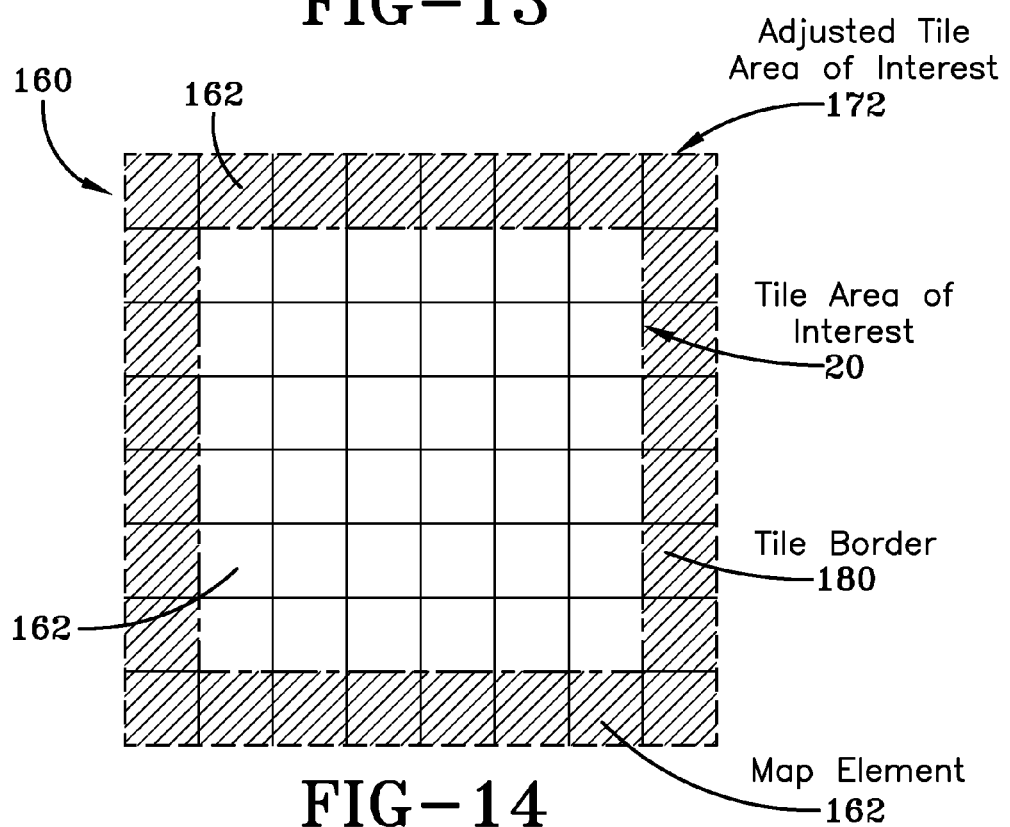
FIG. 14 illustrates the tile map depicted in FIG. 13 and further illustrates an adjusted tile area of interest that includes the tile map surrounded by a representative tile border, in accordance with the disclosed subject matter.

To create tile maps 160, the current implementation (in step 607, FIG. 12A) first allocates a matrix in memory of the proper dimensions, data type, and format for each unique type of tile map 160 (generally a single band of 16-bit signed integers for elevation maps, three channel 8-bit unsigned integers for RGB color data, a single channel 8-bit unsigned integer for mask data, etc.), having a specified resolution (defaults to 512×512 samples), and covering the tile AOI 20, plus an optional border area 180 of variable width (defaults to 8 samples). As shown in FIG. 14, the union of the tile AOI 20 plus the border area 180 constitutes an adjusted tile AOI 172. The inclusion of a border area 180 mitigates seams that would otherwise appear at the boundaries between rendered tile data structures 140. Referring to FIG. 15, for each source dataset 105 (of the appropriate dataset category 120 for the type of tile map 160 being produced) in an overlapping dataset list, the current implementation determines a precise overlap region 185 with respect to the adjusted tile AOI 172, and copies the dataset samples 106 located within the overlap region 185 into an overlap working buffer 175 (step 609, FIG. 12B). The overlap working buffer 175 typically has the same resolution as the source dataset 105 currently being processed. A pre-filtering and paging scheme accommodates datasets 105 whose size exceeds that of main memory.

Figure 12B:
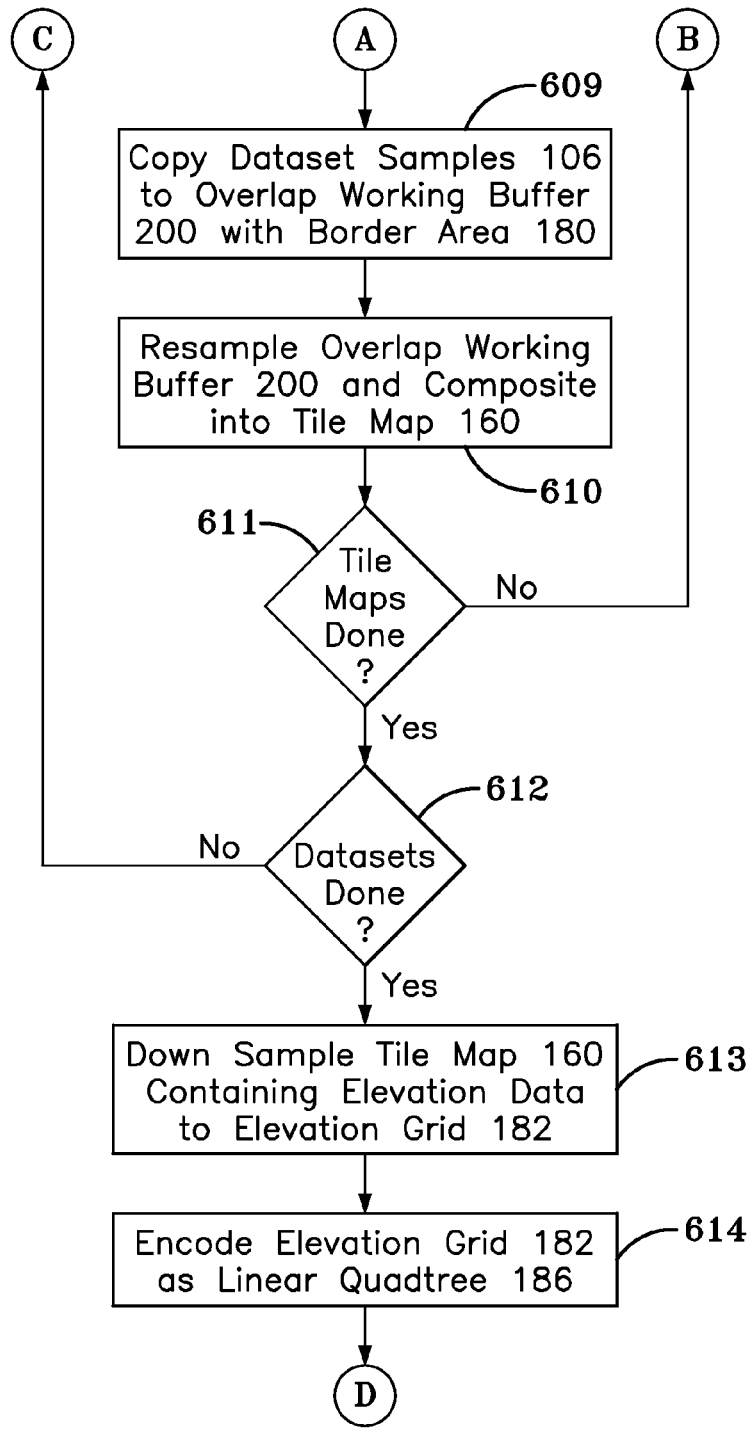

The overlap working buffer 175 is up or down-sampled to match the resolution of a tile map 160 using a MIP-mapping technique and a modified bilinear or bicubic interpolation filter (nearest-neighbor is used in certain situations) that handles cases involving no-data values and masked regions so as to avoid value contamination (step 610, FIG. 12B). Value contamination occurs when valid data are combined with neighboring masked or no-data samples during normative interpolation, producing a corrupted result. It is particularly important to avoid when filtering elevation data because the large disparity between the valid range of elevation samples and the conventionally used no-data values (typically the lowest value(s) representable by the data type, e.g. –32768 for a signed 16-bit integer) can result in extreme artifacts, for example, deep trenches, along the boundaries of no-data value regions.

In embodiments according to the present invention, value contamination is mitigated by transiently extrapolating valid sample data into masked or no-data regions of an interpolation neighborhood. By way of illustration, the interpolation method first identifies whether a source dataset 105 contains any masked or no-data values. If not, the interpolation method proceeds as normal. Otherwise, the interpolation method calls upon a subroutine that examines the interpolation neighborhood for masked or no-data values. If such values are found, a temporary copy of the interpolation neighborhood is created and the masked or no-data values are progressively replaced, via case analysis, with values derived from neighbors containing valid data. This operation repeats until the copied interpolation neighborhood contains only usable data. The result is then fed back and the remainder of the interpolation proceeds normally. The scheme used may introduce a degree of bias by favoring some samples over others as an artifact of the process, but the effect is negligible in practice. Exemplary C++ computer source code documenting this method is provided in Appendix A. As would be apparent to one of skill in the art, the method may be realized in other computer languages.

When the contents of the overlap working buffer 175 are composited into a resampled overlap region 190 within the tile map 160 (step 610, FIG. 12B), an optional data conversion operation 188 may be performed if dataset samples 106 in the overlap working buffer 175 are of a different data type and/or format from the map elements 162 in the tile map 160 (step 610, FIG. 12B). This process is repeated for each tile map 160 and overlapping dataset 105 (steps 611-612, FIG. 12B) using optimizations to exploit spatial coherency in the data, and optionally, parallel execution in a distributed computing environment (step 605, FIG. 12A).

Linear Quadtree Encoding

Figure 17:
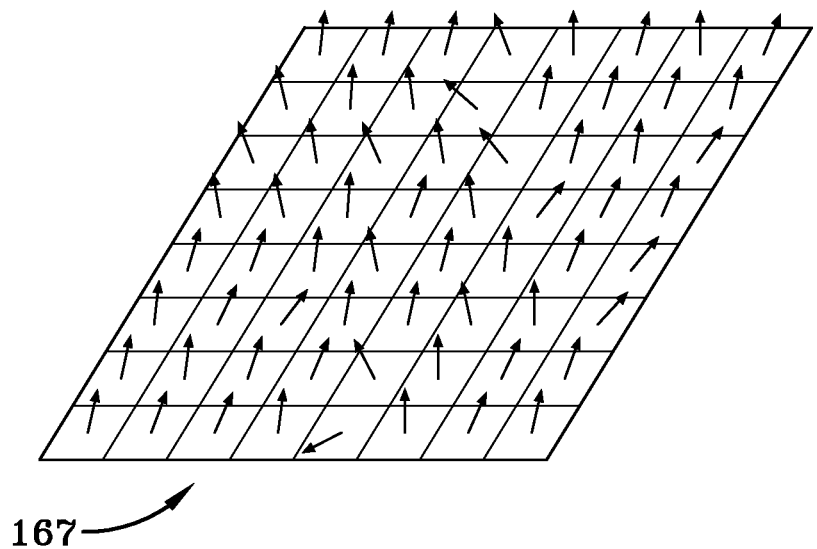
FIG. 17 illustrates a simplified and representative normal map, in accordance with the disclosed subject matter.

The tile maps 160 containing elevation data provide the basis for creating both tile meshes 165 (FIG. 16) and normal maps 167 (FIG. 17) that model the geometric detail of a terrain surface. These two elements compliment one another, with the tile meshes 165 approximating the 3-dimensional shape of the terrain in a piece-wise planar fashion, and the normal maps 167 giving the appearance of fine details and roughness by encoding the surface normals, or local perpendicular directions over the surface, at a greater resolution. In the exemplary embodiment according to the present invention, tile mesh 165 is made up of mesh triangles 166. This composite representation has become well established for high-end systems as a means of enhancing visual fidelity by optimizing what is referred to as the "shading" operation in computer graphics and is familiar to those of skill in the art.

Figures 18A, 18B:
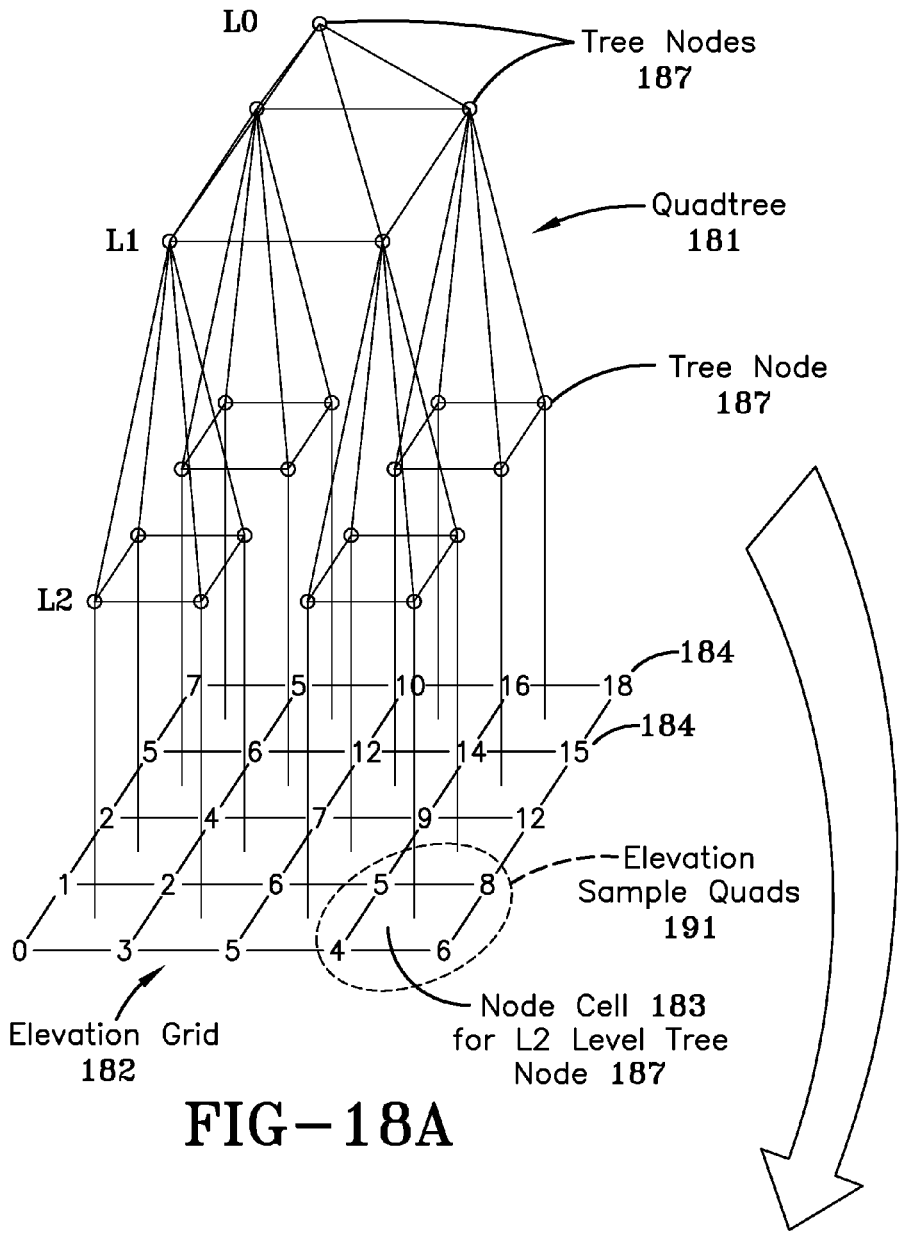
FIG. 18A illustrates a conventional quadtree providing a hierarchical spatial subdivision or partitioning of an elevation grid, in accordance with the disclosed subject matter.
FIG. 18B illustrates a one dimensional array encoding the quadtree of FIG. 18A, in accordance with the disclosed subject matter.

To produce a tile mesh 165 for a tile data structure 140, a corresponding tile map 160 containing elevation data is first downsampled to produce an elevation grid 182 (step 613, FIG. 12B), which is subsequently encoded using a linear-quadtree subdivision scheme (step 614, FIG. 12B). FIG. 18A shows a conventional quadtree 181 that is encoded in a graph structure. Quadtree 181 depicts a hierarchy of tree nodes 187 which define a spatial subdivision of the elevation grid 182. FIG. 18B shows a linearized quadtree 185, which is a mapping of the tree nodes 187 of quadtree 181 to a one-dimensional array. The linearized quadtree 186 is used because it allows for compact storage and fast (constant-time) access to any tree node. Moreover, it is particularly well-suited to this application as the maximum depth is a fixed parameter, and the quadtree is initialized with a full set of tree nodes in the formal sense, i.e., all tree branches are of equal length and extend to the maximum depth. Note that quadtree 181 is an intra-tile quadtree and is distinct from the GVP quadtree directory structure 1010, which organizes the terrain database files 11 which encode tile data structures 140 on disk for runtime access.

The degree of downsampling for a tile mesh 165 is determined by a constraint on the minimum edge-size for mesh triangles 166 (see FIG. 16), as a correlation exists between the geographic spacing of the samples used, and the lengths of the edges of mesh triangles 166 produced. Since a given tile will only be displayed beyond a certain view distance before it is replaced by its higher LOD children, the minimum edge-size is chosen such that a reasonable pixel-to-triangle ratio is maintained during visualization. This ratio is dictated by a trade-off between frame rate and image quality, down to a value of about unity, where smaller mesh triangles 166 will not yield any perceptible increase in detail due to the pixel quantization of the display. A further constraint imposed by quadtree encoding is that the number of rows and columns in the down-sampled map be equal to one another, and be a power of 2 plus 1, greater than or equal to 2, i.e., an m×m map, where m=2i+1, and i is a natural number. The current implementation defaults to 65×65 samples. This translates to a quadtree depth of 7, according to the formula: d=log 2(m−1)+1, again, where m is the number of samples on a side. Hereinafter, this down-sampled elevation map will be referred to as elevation grid 182.

Referring again to FIGS. 18A and 18B, the elevation grid 182 of elevation samples 184 is encoded in a linear quadtree 186 (step 614, FIG. 12B) by allocating it with a depth computed from the grid resolution, as expressed above, and establishing a one-to-one correspondence, using node cell coordinates (i, j, derived from the raster coordinates of elevation grid 182), between its lowest-level tree nodes 187 and contiguous elevation sample quads 191. In each successively higher level of the linear quadtree 186, the range of node cell coordinates approximately halves, and the number of elevation samples 184 lying within the node cell 183, or footprint, of a node roughly quadruples (boundary samples are shared between adjacent node cells 183), such that the cell coordinates of the root node are (0, 0) and its cell spans the entire elevation grid 182. In addition, each tree node 187 stores data specifying its type and spatial relationship to its siblings. The type field indicates if the node is internal, leaf, or virtual. At this stage, all nodes are set to virtual as the quadtree configuration, from which the triangle mesh 165 is ultimately derived, has not yet been determined. The sibling-relationship field, which facilitates a configuration constraint described later, indicates if the node is the bottom-left, bottom-right, top-right, or top-left child of the parent. In the special case of the root node, the value of this field is undefined.

Refinement Rule Specification

A straightforward approach to creating 3-dimensional geometry for a tile data structure 140 would be to simply convert the elevation grid 182 into a regular mesh, i.e., a mesh exhibiting a consistent, repeating pattern. In this case, the elevation samples 184 would translate directly to mesh vertices 168, with triangle pairs spanning the space within each contiguous 2×2 vertex quad. The major drawback of this scheme is that uniform vertex spacing does not efficiently model the shape of real terrain, which varies considerably in the spatial frequency distribution of its features. This is to say, that for a given, fixed spacing, either plains and valleys will be oversampled, wasting resources, or, mountainous or otherwise rugged areas will be undersampled, yielding an unacceptable loss of fidelity. A better alternative is to use an adaptive method that concentrates vertices and triangles (more generally referred to as "geometric primitives") in areas where they are most needed, areas with high-frequency elevation changes of significant amplitude.

Various adaptive methods may be used to concentrate geometric primitives in areas of high frequency change. Regardless of the method used, one or more rules governing the selective refinement or simplification of tile meshes 165 must first be defined (step 615, FIG. 12C). In one embodiment according to the present invention, a number of function objects serving this purpose collectively are referred to as "split tests." Split tests are prioritized refinement rules that specify unique thresholds or other criteria for subdividing a tree node 187 in the linear quadtree (step 616, FIG. 12C), effectively refining the resultant tile mesh 165 by increasing its local vertex and triangle density. The specifics of an exemplary split test will be described in the next section. The split tests form an inheritance hierarchy in an object-oriented sense, and thus are extensible and share a common, base interface. All split tests accept a quadtree reference, a node index, and an optional output parameter giving the refinement priority of the node. The refinement priority serves to minimize error if the process must be prematurely halted due to exhaustion of the specified triangle budget. In the exemplary embodiment, the maximum allowable triangle budget for each tile mesh 165 defaults to 4096. Other triangle mesh budgets may be used in alternative embodiments depending on the capabilities of a particular system. When evaluated, the split tests return a verdict of "yes," "no," or "don't care."

Figure 20:
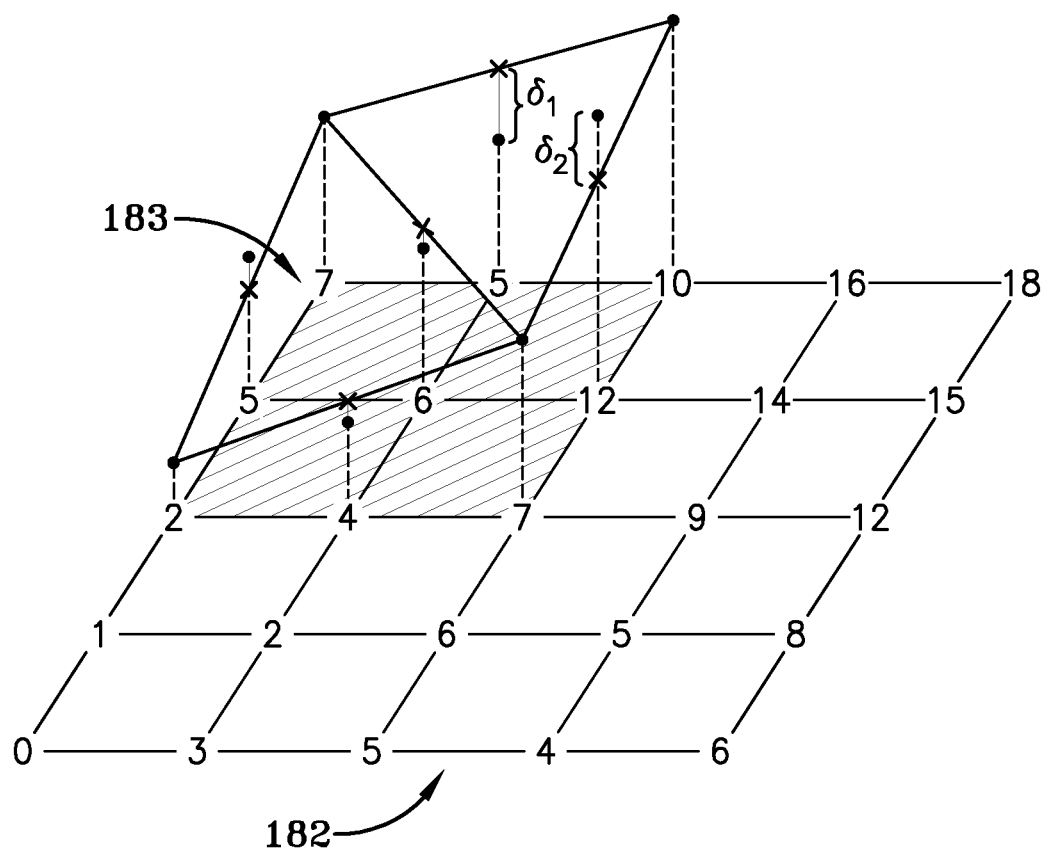
FIG. 20 illustrates the application of a maximum sampling error split test to the adaptive sampling process of elevation grids, in accordance with the disclosed subject matter.

Different split tests are designed for different applications, and can be used in combination, for greater flexibility. Referring to FIG. 20, a generic split test enforces a maximum sampling error, $\delta_{max}$, and applies to single or multi-tile databases assuming either a flat or ellipsoidal reference model. Two additional split tests are specific to ellipsoidal models. The first of these is a smoothness test, which ensures that tile meshes 165 adequately approximate the curvature of a planetary body when warped into a geocentric coordinate space, irrespective of any surface features that may or may not be present. The second is a polar-sampling test that constrains the refinement, or rate of sampling, at extreme latitudes to compensate for singularities at the poles caused by geographic projection. A future revision may circumvent this issue entirely. For multi-tile databases, an additional border test takes a conservative approach and forces the limiting degree of refinement along mesh boundaries. This constraint, together with the semi-regular pattern inherent to quadtree subdivision, ensures that no gaps occur between tiles at the same LOD (gaps between tiles of different LOD are addressed later). Moreover, it does this without introducing data dependencies into the tile-creation process, thereby simplifying parallelism and maximizing build performance.

While theoretically incurring some overhead cost in terms of the number of mesh triangles 166 produced, the restricted application of this test to the border regions, combined with the mesh refinement already demanded by other split tests, causes any penalty to be negligible in practice.

Adaptive Triangulation

Figure 19A:
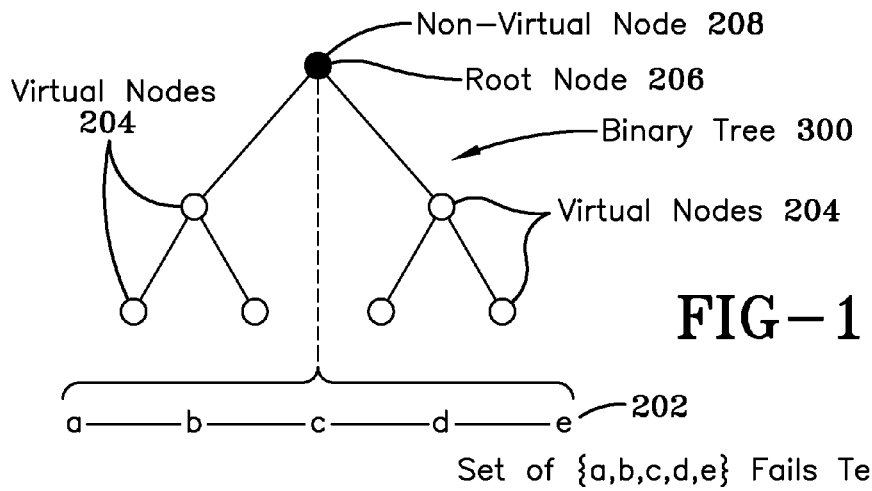
FIGS. 19A-C show a binary tree adaptive sampling of line, in accordance with the disclosed subject matter.
Figure 19B:
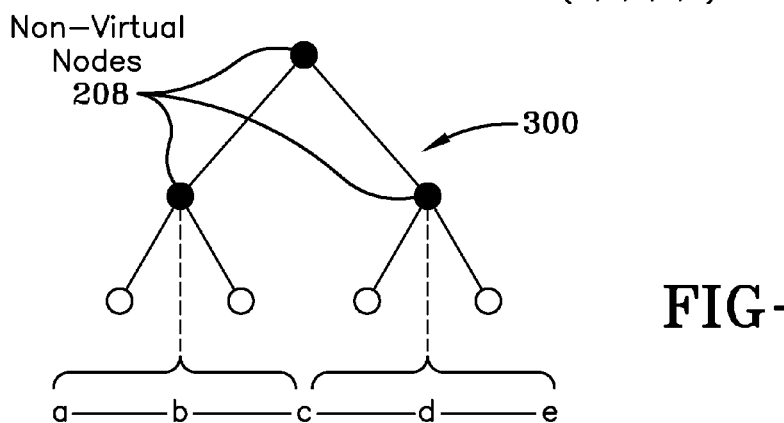
Figure 19C:
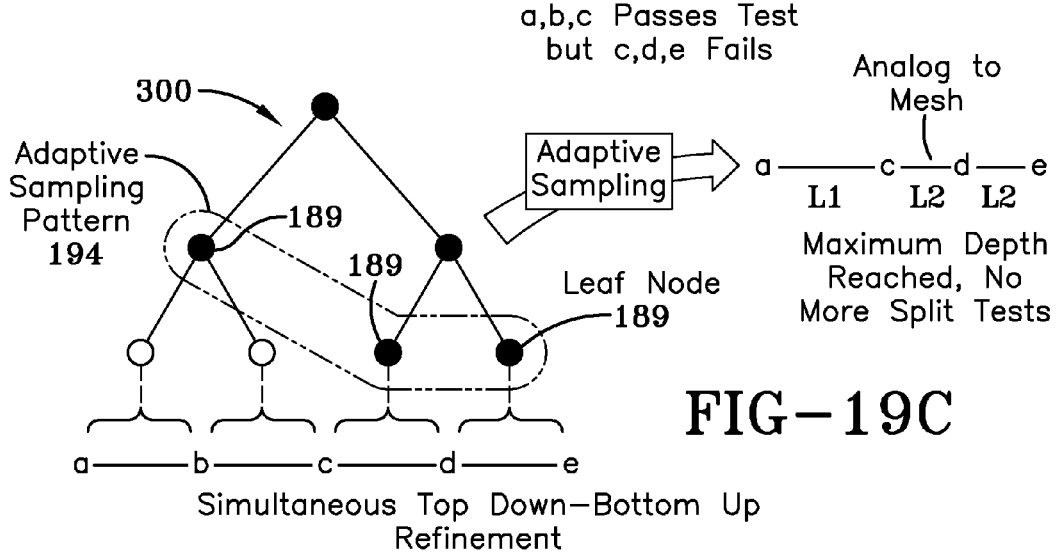

FIGS. 19A, 19B, and 19C show a binary tree 300, adaptive sampling of a line 202, and the development of an exemplary adaptive sampling pattern 194 (with reduced dimensionality relative to the present invention). Without loss of generality, it should be clear that the binary tree 300 has been used to simplify discussion of the adaptive sampling process. As previously noted, embodiments according to the present invention generally employ a quadtree 181 implemented as a linear quadtree 186. In similar form, binary tree 300 is composed of non-virtual nodes 208 and virtual nodes 204, where the latter are placeholders for the former, as in the quadtree 181.

In analogous fashion to the procedure illustrated in FIGS. 19A-C (described in detail below), embodiments according to the present invention convert a quadtree-based adaptive sampling pattern 194 into a tile mesh 165 (step 618, FIG. 12C). In the context of the invention, the term triangulation refers to this conversion process (recall a tile mesh 165 is composed of mesh triangles 166), where the adaptive sampling pattern 194 is encoded in a linear quadtree 186 as a particular configuration of leaf nodes 189 (the nodes that have no non-virtual children in the tree). During conversion, each leaf node 189 yields between 2 and 8 mesh triangles 166 depending on the relative LOD offsets of its neighbors. While a variety of geometric primitives may be used in alternative embodiments, triangles are the geometric primitive of choice as they are convex and planar by definition, making them easy to process. Moreover, virtually all graphics hardware is optimized to render surfaces using them. Exemplary C++ computer source code documenting the method of creation of adaptive sampling pattern 194 and its conversion to the tile mesh 165 is provided in Appendix B. Again, as would be apparent to one of skill in the art, the method may be realized in other computer programming languages.

Returning to FIGS. 19A, 19B and 19C, prior to triangle generation, the adaptive sampling pattern 194 is produced by creating and expanding a section of non-virtual nodes 208 down from the root node 206 of the quadtree 181 toward its lowest level using the split tests described above. Recall that a quadtree is first allocated with all virtual nodes. Upon its creation (shown by analogy using the binary tree 300 in FIG. 19A), this section of non-virtual nodes 208 comprises only the root node 206, which becomes the initial leaf of the quadtree, and covers the entire elevation grid 182 with a single node cell. Designated split tests are then applied to determine if the root node 206 must be subdivided into its four children in order to satisfy the refinement criteria. If it does, the root becomes an internal node, its four children become new leaf nodes, and the elevation grid 182 is divided up among the four child cells; otherwise the refinement terminates. This same procedure is repeated in a tail-recursive fashion, using a priority queue, for each of the children until the split tests indicate that no further refinement is required, or a running estimate of the triangle yield exceeds the allowed budget. There is one additional constraint imposed on the sampling pattern to facilitate tile mesh 165 generation and prevent artifacts, in particular, T-junctions and potential cracks, from forming between adjacent mesh triangles 166, and that is that no leaf node in the quadtree may differ from its neighboring leaf nodes by more than one level. Enforcement of this constraint is expedited by the node-indexing scheme of the linearized quadtree 186. The current implementation also caches the indices of neighboring cousins to each node for additional performance.

From a standpoint of computational complexity, the dominant element in the sampling process is the split test that accounts for the maximum error, or deviation, of the sampling pattern relative to the elevation values in the grid. See FIG. 20. To accomplish this, it calculates the vertical distance between each elevation sample within a leaf node's cell and the appropriate plane equation derived from the node's hypothetical triangulation. The largest of these distance values, δmax, is compared against a threshold parameter, δthreshold. If the value of δthreshold is exceeded, the node is flagged for subdivision. In the worst case, where node subdivision uniformly proceeds to the lowest level, each elevation sample in the grid will be visited a number of times related to the depth of the quadtree. The computational complexity of this procedure is given by the summation: $f(m)=\Sigma 4l[(m-1)/2l-1+1]^2$, where l is the level of the quadtree running from 1 to the maximum depth, and m is the number of samples on a side as described above. Intuitively, this can be understood by considering that the union of disjoint node cells from each level in the quadtree forms a set cover over the samples in the grid. Exemplary C++ computer source code implementing the split test that accounts for elevation error is set forth in Appendix D.

Figure 21:
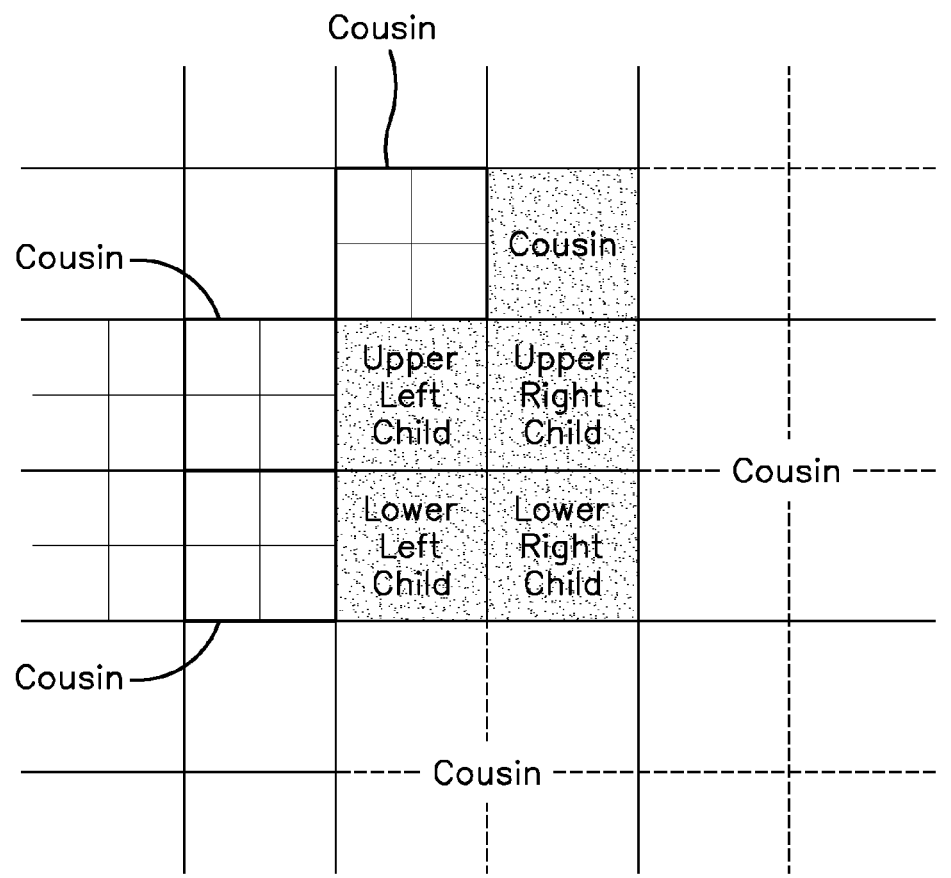
FIG. 21 illustrates the relationships among and relative refinement of nodes populating a small neighborhood of a quad tree, in accordance with the disclosed subject matter.

After an adaptive sampling pattern 194 for an elevation grid 182 has been defined, the triangulation process begins in earnest. Two dynamic arrays are first allocated, one to store triangle faces and the other the triangle vertices. Triangle faces are defined by triplets of vertex indices. The leaf nodes 189 constituting the adaptive sampling pattern 194 are then iterated through and classified according to their sibling-relative position within a quad (upper left, lower right, etc.). This classification is used to support identification of and access to a node's four orthogonal neighbors, i.e. those that are at the same tree depth and have bordering node cells 183 that share a side (necessarily) in the cardinal directions of North, South, East, and West. Note that in the general case of a quadtree, two of these neighbors will be siblings and two will be cousins (shown in FIG. 21). In border cases, some of these neighbors will not exist. The relative level of refinement for each neighboring region is then determined from the neighboring node type. If a neighboring node is virtual, then the region immediately opposite the shared side (containing the neighboring node cell 183) must have a relative refinement level of −1. If the neighboring node is a leaf, then the region has a relative refinement level of 0. Otherwise, the neighboring node must be of type internal, and thus the region has a relative refinement level of +1. These three values are the only possibilities given the restricted-quadtree constraint described above.

Following determination of the relative refinement levels for all four regions bordering the sides of a node cell 183, vertices are generated for the node-cell 183 corners. In situations where a side of a node cell 183 borders a region of +1 refinement, an additional vertex is generated for the side's midpoint, effectively bisecting that side in the triangulation. Optionally, when one or more sides have been bisected, a vertex may be created for the node-cell 183 center to support a Binary Triangle Tree (bintritree)-like tessellation, composed entirely of right isosceles triangles (see FIG. 22). This tessellation scheme facilitates the smooth geo-morphing between tile levels described below, and has a number of other useful properties. Though adopted in the exemplary embodiment of the invention, this tessellation scheme is not the only possibility. Each generated vertex is then assigned a pair of horizontal coordinates based on its location within the geospatial extents of the elevation grid 182, and a vertical coordinate from the corresponding elevation grid sample 184. Afterwards, the vertices are added to the previously allocated vertex array in a manner that avoids duplicates arising from the adjacency of neighboring node cells 183.

Figure 22:
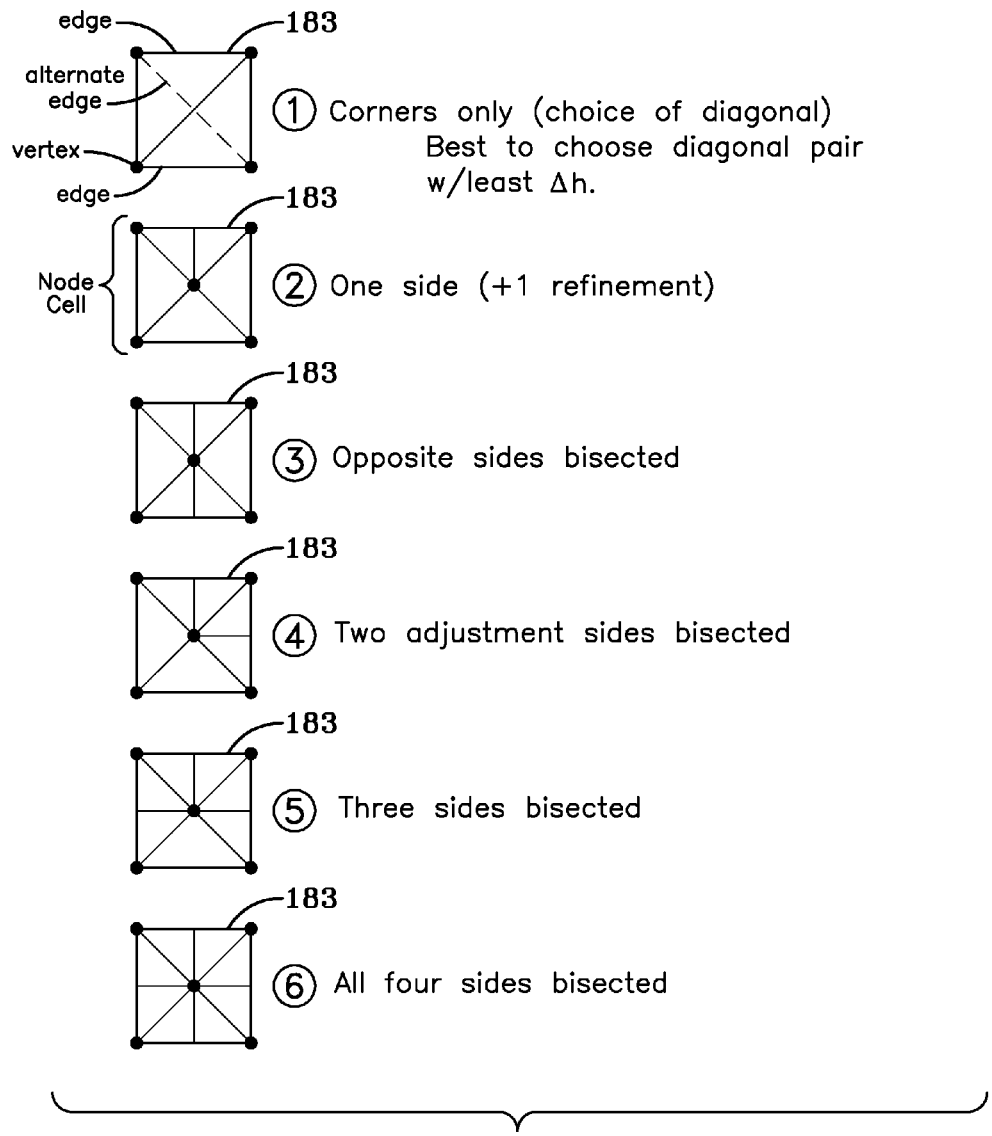
FIG. 22 illustrates the unique cases for triangulation of a node cell with a binary triangle tree-like tessellation (exploiting rotational similarity), in accordance with the disclosed subject matter.
Figure 23:
FIG. 23 illustrates an exemplary node cell configuration from an arbitrary adaptive sampling pattern, and resulting triangle mesh exhibiting a binary triangle tree-like tessellation, in accordance with the disclosed subject matter.
Figure 23:
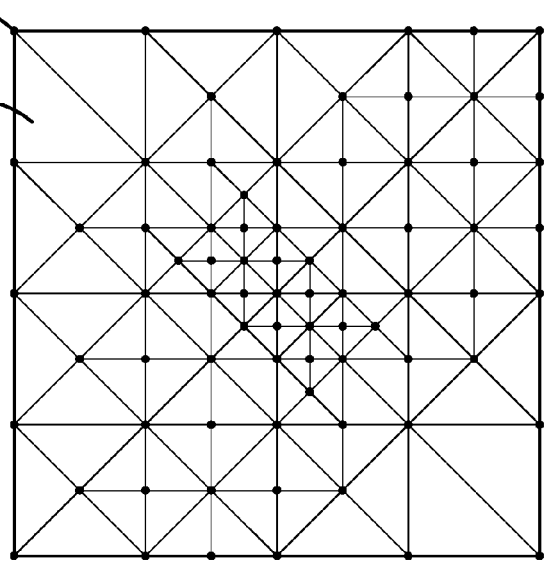

Triangle faces spanning each node cell 183 are subsequently defined by pattern matching on the vertex configuration of node cell 183, and by referencing the appropriate vertex indices. Exploiting rotational similarities, there are six possible vertex configurations, leading to six triangulation patterns of a node cell 183 within a given tessellation scheme. The six patterns for the binary-triangle-tree scheme are shown in FIG. 22. Note that other pattern schemes are possible. Resulting index triplets are added to the triangle face array, describing a mesh triangulation pattern as illustrated in FIG. 23. The data contained within the triangle vertex and face arrays is later repackaged into an output tile mesh 165 using triangle strips or other data structures optimized for graphics display. This completes the triangulation process. As mentioned previously, exemplary C++ computer source code implementing the process of how the sampling pattern 194 is actually triangulated is set forth in Appendix C. As would be apparent to one of skill in the art, the process may be realized in other computer languages.

A natural extension of the tile mesh data structure 165 and creation process is the addition of geo-morphing (mentioned above) so as to simulate a continuous LOD in the terrain models and avoid objectionable "popping" artifacts that occur when tiles at different LODs are substituted for one another in the display. When employing certain tessellation schemes, such as that resembling the triangulation of a binary triangle tree (described earlier), the refinement of the tile mesh 165 (i.e., the addition of mesh primitives to increase the amount of detail that is representable) adds additional mesh triangles 166 within the bounds of mesh triangles 166 that already exist in such a way that new edges and vertices 168 are either coincident with the existing edges and mesh vertices 168, or are contained within the existing mesh-triangle 166 interiors. Thus, these new edges do not cross preexisting ones. If the added mesh vertices 168, which are unique to the child mesh triangles 166, are constrained to lie within the plane of the parent mesh triangle 166, rather than derive their heights from the elevation grid 182, then the child mesh triangles 166 will mimic the appearance of the parent. By interpolating between these two modes, a smooth transition between successive LODs will result. In the exemplary embodiment, two sets of vertex positions and normals are stored within each tile mesh 165 and the smooth transition is facilitated through the use of a Graphics Processing Unit (GPU) executing enabling vertex and fragment shader code. In order to maintain the independence of parallel processing nodes 1015 in the generation of the GVP terrain database 1000, embodiments according to the present invention may generate a temporary, parent tile mesh 165 for each quad of tile mesh 165 siblings (relationship with respect to the quadtree directory structure 1010) processed. This parent tile mesh 165 is the source of the lower level-of-detail set of mesh vertex 168 positions and normals for each of the sibling tile meshes 165 produced. The overhead associated with this modification adds approximately 25% to the cost of mesh generation.

Figure 12C:
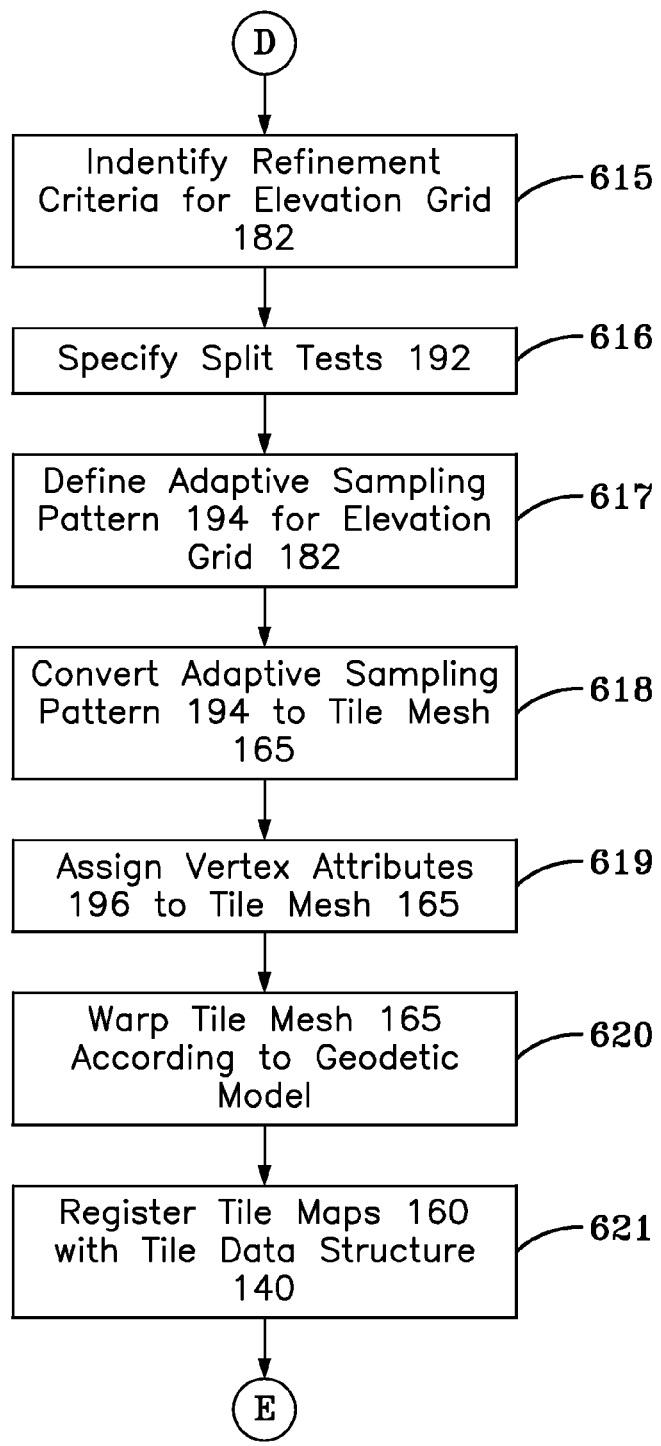

In addition to holding 3D positions and geometric surface normals, optionally including a second set to support geomorphing as described above, mesh vertices 168 store registration coordinates for tile maps 160, along with other standard and optional attributes specified herein (step 619, FIG. 12C). In embodiments according to the present invention, a single set of normalized 2D coordinates is shared among all tile maps 160 for a given tile mesh 165. Moreover, and primarily to facilitate lighting calculations and normal mapping, each mesh vertex 168 also contains vectors specifying the local perpendicular and ellipsoid tangent, conventionally in the longitude direction, from which a local basis or frame may be defined at runtime. Per-vertex color or other attributes, such as ambient occlusion coefficients, may also be stored with each mesh vertex 168 depending on the intended application and embodiment.

A dynamic, weighted combination of vertex normals and normal maps 167 is used to enhance the appearance of surface topography and facilitate transitions throughout the LOD hierarchy. Normal mapping effectively enhances the apparent detail of a tile mesh 165 by supporting per-pixel lighting calculations at the lower LODs, where mesh triangles 166 span many elevation samples 184 (with respect to the highest spatial resolution available). The transition to vertex normals becomes necessary at the higher LODs to mitigate bilinear interpolation artifacts in the normal map 167 that become noticeable when the apparent display resolution approaches or exceeds that of the best sampled elevation data used to generate the normal maps 167. In current embodiments according to the present invention, the relative weighting of vertex-normal and normal-map 167 contributions to the blended result is based on viewpoint altitude, but other metrics, including projected texel differentials, may be used in alternative embodiments. Runtime computations associated with this feature are preferably implemented in shader code and executed on a GPU. Exemplary GLSL computer source code documenting this process is set forth in Appendix E.

Following the creation of a tile mesh 165 in geographic space, where the positions of mesh vertices 168 are conventionally specified in decimal degrees of latitude and longitude, and height values in meters, the tile mesh 165 is warped according to the given geodetic model and its positions are transformed into an XYZ geocentric coordinate space (step 620, FIG. 12C). The geodetic model nominally used conforms to the WGS 84 standard, but others may be employed depending on the application. A bias or offset is then added to all mesh vertex 168 positions such that the mesh vertex 168 with the minimum latitude and longitude coordinates is shifted to the geocentric origin, i.e. (0, 0, 0). This is done to maximize precision when the position values are converted from a double to a single precision floating-point format for file storage and processing within a graphics pipeline. The bias is accounted for during visualization so that each tile mesh 165 is displayed in its correct geospatial position.

After a tile mesh 165 has been configured, it is incorporated into a tile data structure 140. Designated fields within the latter are then set to reference the associated tile maps 160 (step 621, FIG. 12C). Tile maps 160 may be embedded within a tile data structure 140, or stored externally when writing the data out to file.

Figure 12D:
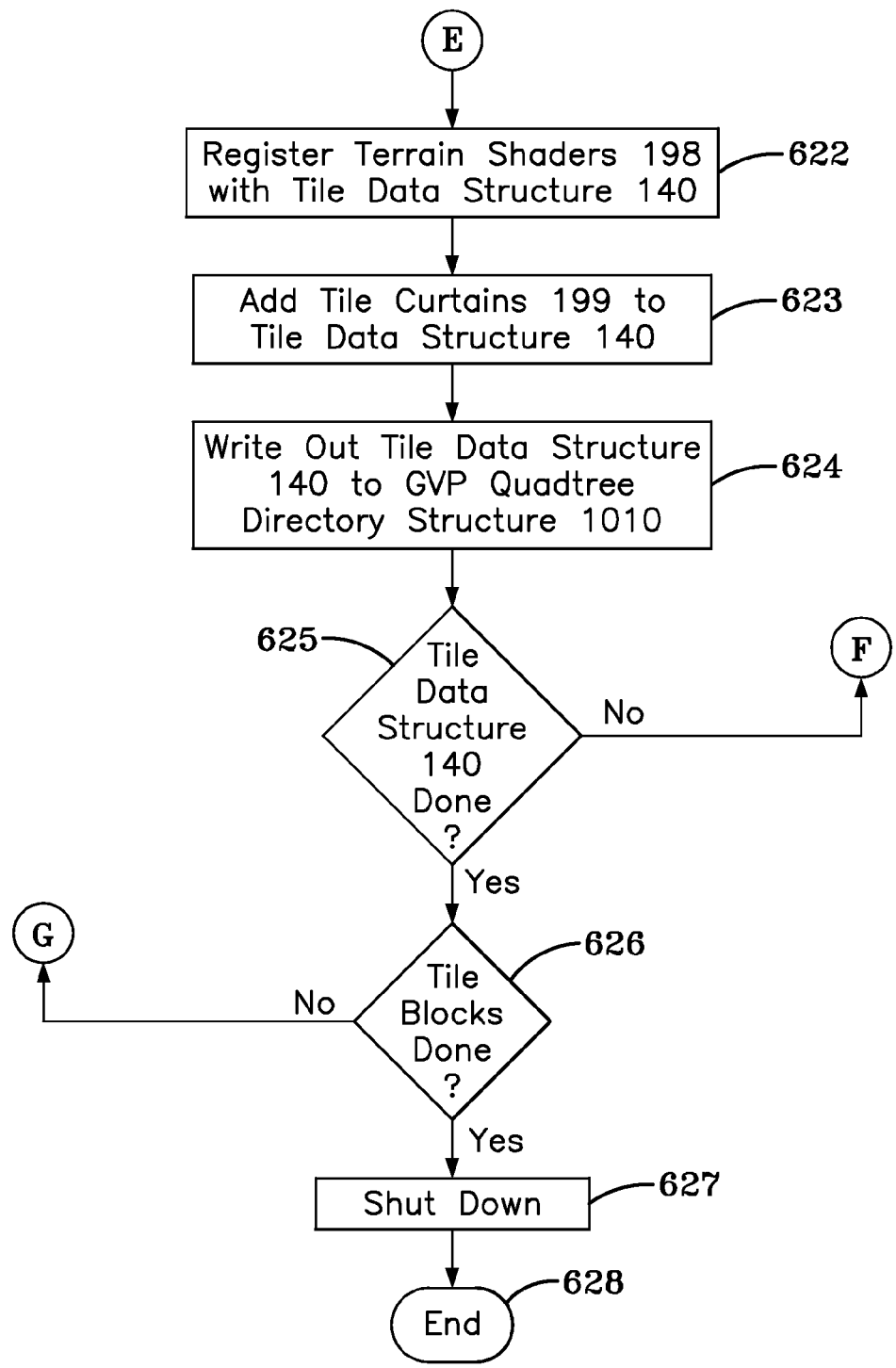

To enhance the appearance of terrain models, terrain shaders 198 are optionally registered with tile data structures 140 (step 622, FIG. 12D). Terrain shaders 198 support normal mapping, blended normals, LOD transitions via geomorphs, material reflectance models, and other advanced graphics features. In embodiments according to the present invention, they are preferably implemented as programs defined by computer source code in the OpenGL Shading Language, and compiled and executed at runtime on a compliant graphics processing unit (GPU).

While gaps between adjacent tiles meshes 165 at the same LOD are eliminated via the border constraint, gaps arising between adjacent tiles of differing LODs, which occur at runtime as a consequence of the paging scheme, are mitigated using a modified version of the tile curtains 199 (not illustrated) as described in U.S. Pat. No. 7,564,455 to Gatewood, Jr., et al., issued on Jul. 21, 2009, and incorporated herein by reference as if fully set forth. The modification includes the application of tile maps 160 to a tile curtain 199 in similar fashion to a tile mesh 165 (as described earlier) that enhances its ability to fill in visible gaps with a vertical surface giving the appearance of continuous terrain. In particular, the surface normals of a tile curtain are rotated and perturbed to shade the surface as if it were an integral part of the terrain. As heterogeneous tile boundaries, with respect to LOD, generally occur only at a significant distance to the viewer during visualization, this technique as employed in embodiments according to the present invention provides for effective visual masking of gaps in the said circumstance. Tile curtains are created for and added to each tile data structure 140 as auxiliary geometry elements to its tile mesh 165 (step 623, FIG. 12D).

After a tile data structure 140 is completed, it is written out to a terrain database file 11 using a path within the GVP quadtree directory structure 1010 (step 624, FIG. 12D) that encodes its position within the quadtree. Associated tile maps 160 may be embedded within a tile data structure 140 when it is stored as a terrain database file 11, or the tile maps 160 may be stored as external image files. Tile maps 160 are preferably stored using a DXT or other GPU-supported compression scheme to minimize loading overhead at runtime.

Generation of tile data structures 140 within a block 17 proceeds in loop fashion until all tile data structures 140 comprising the block 17 are completed (step 625, FIG. 12D) and output as terrain database files 11 to a GVP quadtree directory structure 1010. In distributed computing environments, a tile generator 210 informs its assigned build manager 209 when a block 17 is completed so that it may receive another job (specifying a remaining block 17) to process.

Processing of tile blocks 17 continues in the manner described above until a GVP quadtree directory structure 1010 is produced and populated by terrain database files 11 covering a project AOI 12, and satisfying the parameters of a given build configuration file 130 (step 626, FIG. 12D). In embodiments according to the present invention, status updates on the processing of tile blocks 17 are recorded in a build log, and preferably provided to the user in real-time, along with any detected error conditions that might arise.

Following the completion of all tile blocks 17, the build process makes the appropriate summary log entries and releases all held system resources before shutting down (step 627, FIG. 12D). In the case of a distributed computing environment, the build manager 209 closes connections with its associated tile generators 210 before initiating the shutdown sequence. Embodiments according to the present invention may also perform a validation pass over a generated set of terrain tile database files 1000 residing within a GVP quadtree directory structure 1010 before termination.

This concludes the operation of the Terrain Database Builder (step 628, FIG. 12D).

CONCLUSION

Although the present invention has been described in considerable detail with reference to certain embodiments hereof, it will be clear to one skilled in the art that the above embodiments may be altered in many ways without departing from the invention. Accordingly, the spirit and scope of the appended claims should not be limited to the description of the embodiments contained herein.

What is claimed is:

1. A process for prioritized refinement of a tile mesh modeling a surface in a level-of-detail hierarchy, comprising:
   obtaining a plurality of elevation values for an elevation grid of the surface;
   downsampling a rasterized elevation grid to a resolution based on a minimum edge size for triangles of the tile mesh, as determined by a level-of-detail (LOD) parameter, balancing object-space and view-space LOD mechanisms;
   encoding the elevation grid into a linearized quadtree of virtual nodes;
   iteratively refining the quadtree according to an adaptive sampling pattern based on prioritized split tests using application specific criteria; and
   converting the optimized linearized quadtree into a tile mesh,
      wherein a split test forces a limiting degree of prioritized refinement along mesh boundaries in multi-tile databases to avoid introducing inter-tile data dependencies during tile creation and display.

2. The process according to claim 1, wherein the prioritized split tests comprise a constraint on a degree of refinement along mesh boundaries so as to ensure avoidance of artifacts.

3. The process according to claim 1 wherein the prioritized split tests comprise a smoothness test, to ensure that the tile mesh adequately approximates the curvature of a planetary body when warped into a geocentric coordinate space, irrespective of any surface features that may or may not be present.

4. The process according to claim 1, wherein the prioritized split tests comprise a maximum sampling error test.

5. The process according to claim 1, wherein the prioritized split tests comprise a polar-sampling test that constrains the refinement of the mesh at extreme latitudes to compensate for singularities at the poles caused by geographic projection.

6. The process according to claim 1 further comprising using a dynamic, weighted combination of vertex normals and normal maps to enhance the appearance of surface topography and facilitate transitions throughout the level-of-detail hierarchy.

7. The process according to claim 1 wherein smooth transitions between coextensive tile meshes at adjacent levels of detail are supported.

8. The process according to claim 1 wherein the smooth transitions between coextensive tile meshes at adjacent levels of detail are supported using hardware acceleration.

9. The process according to claim 1 wherein terrain shaders may be optionally registered with a tile data structure comprising the tile mesh.

10. The process according to claim 1 wherein the level-of-detail hierarchy may exceed a client computer's memory.

11. The process according to claim 1 wherein the tile mesh produced is suitable for use in both flat-earth and round earth terrain model databases.

12. The process according to claim 1, wherein a split test enforces a maximum sampling error and applies to a single or multi-tile database assuming either a flat or ellipsoidal reference model.

13. The process according to claim 1, wherein a split test ensures that the tile mesh approximates the curvature of a planetary body when warped into a geocentric coordinate space, irrespective of any surface features that may or may not be present.

14. The process according to claim 1, wherein a split test is a polar sampling test that constrains the prioritized refinement at extreme latitudes to compensate for singularities at the poles caused by geographic projection.

15. The process according to claim 1, wherein the tile mesh is suitable for use with point-of-interest terrain models where priority is allocated to specific locations on the terrain.

* * * * *